(12) United States Patent
Ramun

(10) Patent No.: US 8,308,092 B2
(45) Date of Patent: Nov. 13, 2012

(54) MULTIPLE TOOL ATTACHMENT SYSTEM WITH UNIVERSAL BODY WITH GRAPPLE

(76) Inventor: John R. Ramun, Poland, OH (US)

( * ) Notice: Subject to any disclaimer, the term of this patent is extended or adjusted under 35 U.S.C. 154(b) by 417 days.

(21) Appl. No.: 12/570,805

(22) Filed: Sep. 30, 2009

(65) Prior Publication Data

US 2010/0032973 A1 Feb. 11, 2010

Related U.S. Application Data

(60) Continuation-in-part of application No. 11/520,510, filed on Sep. 13, 2006, now abandoned, which is a division of application No. 11/101,265, filed on Apr. 7, 2005, now Pat. No. 7,108,211, which is a division of application No. 10/089,481, filed as application No. PCT/US00/28367 on Oct. 13, 2000, now Pat. No. 6,994,284.

(60) Provisional application No. 60/159,869, filed on Oct. 15, 1999, provisional application No. 60/195,797, filed on Apr. 10, 2000.

(51) Int. Cl.
*B02C 1/02* (2006.01)
(52) U.S. Cl. .................... 241/101.73; 241/266
(58) Field of Classification Search .................. 241/266, 241/101.73
See application file for complete search history.

(56) References Cited

U.S. PATENT DOCUMENTS

| | | | |
|---|---|---|---|
| 4,023,848 A | 5/1977 | Bennett | |
| 4,196,862 A | 4/1980 | Tagawa | |
| 4,403,431 A | 9/1983 | Ramun et al. | |
| 4,670,983 A | 6/1987 | Ramun et al. | |
| 4,799,852 A | 1/1989 | Ramun | |
| 4,838,493 A | 6/1989 | LaBounty | |
| 4,890,798 A | 1/1990 | Tagawa et al. | |

(Continued)

FOREIGN PATENT DOCUMENTS

DE 4208245 A1 9/1993

(Continued)

OTHER PUBLICATIONS

Maturana, F., "A Finite Element Based Tool to Automate Optimal Design Process", Proccedings of the 1994 Summer Computer Simulation Conference, 1994, pp. 63-66.

(Continued)

*Primary Examiner* — Faye Francis
(74) *Attorney, Agent, or Firm* — The Webb Law Firm

(57) ABSTRACT

A multiple tool attachment system is adapted to be attached to demolition equipment. The system includes a universal body attached to the demolition equipment. A series of tools is independently attachable to the universal body. The universal body includes a guide slot extending longitudinally along the universal body. Each tool generally includes a pair of pivotable jaws adapted to be pivotably attached to the universal body with at least one linkage extending from the universal body and attachable to each jaw of the tool. A slide member is received within the guide slot, with each linkage attached to the slide member, and a piston cylinder arrangement is attached to the universal body and coupled to the slide member for moving the slide member and the jaws. The multiple tool attachment system is provided with quick change features and is designed to optimize the cutting characteristics throughout the movement cycle. A tool set such as a grapple may be centrally supported by bridge housings thereby minimizing the stresses across the main pivot pin. Additionally, a tool set such as a grapple may have tine surfaces with wear plates welded directly thereto to minimize wear.

20 Claims, 44 Drawing Sheets

U.S. PATENT DOCUMENTS

| | | |
|---|---|---|
| 4,893,493 A | 1/1990 | Jacques et al. |
| 4,897,921 A | 2/1990 | Ramun |
| 4,903,408 A | 2/1990 | Tagawa et al. |
| 4,951,886 A | 8/1990 | Berto |
| 5,044,568 A | 9/1991 | Shigemizu |
| 5,044,569 A | 9/1991 | LaBounty et al. |
| 5,060,378 A | 10/1991 | LaBounty et al. |
| 5,199,658 A | 4/1993 | Bartels et al. |
| 5,243,761 A | 9/1993 | Sullivan et al. |
| 5,359,775 A | 11/1994 | Morikawa et al. |
| 5,361,999 A | 11/1994 | Sakato et al. |
| 5,474,242 A | 12/1995 | Rafn |
| 5,480,100 A | 1/1996 | Tagawa et al. |
| RE35,432 E | 1/1997 | LaBounty et al. |
| 5,626,301 A | 5/1997 | Morikawa et al. |
| 5,628,611 A | 5/1997 | Ito et al. |
| 5,636,802 A | 6/1997 | Tagawa |
| 5,645,236 A | 7/1997 | Sugiura et al. |
| 5,671,892 A | 9/1997 | Morikawa et al. |
| 5,738,289 A | 4/1998 | Tagawa |
| 5,926,958 A | 7/1999 | Ramun |
| 5,940,971 A | 8/1999 | Ramun |
| 6,061,911 A | 5/2000 | LaBounty et al. |
| 6,092,290 A | 7/2000 | Vogelsanger |
| 6,655,054 B1 | 12/2003 | Ward |
| 6,662,610 B1 | 12/2003 | Sekita et al. |
| 6,994,287 B2 | 2/2006 | Okamura et al. |
| 7,032,335 B2 | 4/2006 | Short |
| 7,108,211 B2 | 9/2006 | Ramun |
| 7,284,718 B2 | 10/2007 | Christenson |
| 2006/0131454 A1 | 6/2006 | Ramun et al. |
| 2007/0001041 A1 | 1/2007 | Christenson |

FOREIGN PATENT DOCUMENTS

| | | |
|---|---|---|
| FR | 2822482 A1 | 9/2002 |
| GB | 2243358 A | 10/1991 |
| WO | 03021047 A1 | 3/2003 |
| WO | 2010099980 A1 | 9/2010 |

OTHER PUBLICATIONS

Hale Idex Corporation, HP Combo Tool Instruction Manual, 2004 Hale Products, Inc., pp. 1-6.

Loeffelholz, S., "CAD/CAM comes of age", Financial World, Oct. 18, 1988, vol. 157, No. 22, pp. 38-40, Abstract.

VIEW A-A

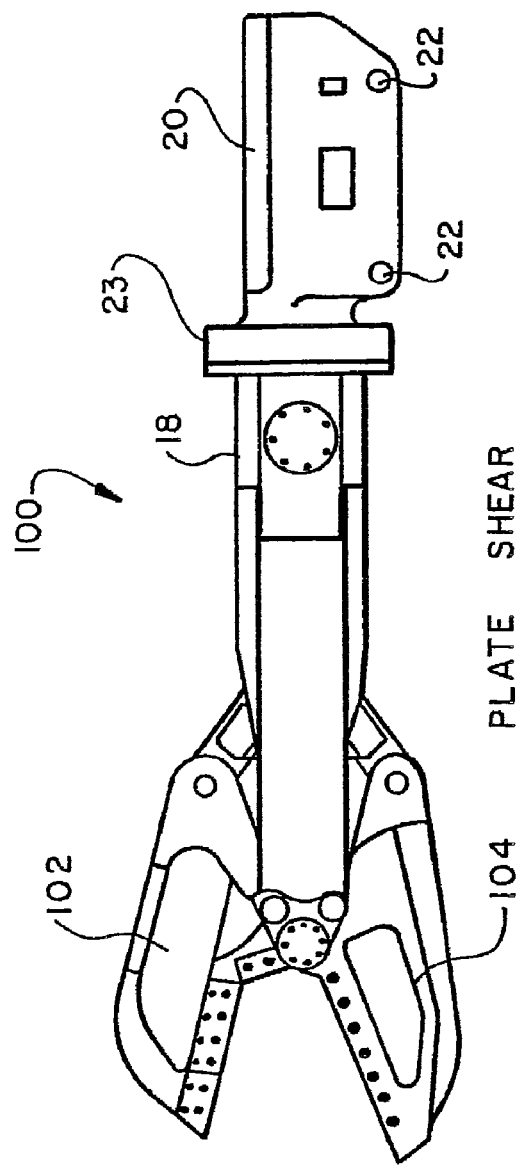
FIG. 12 PLATE SHEAR
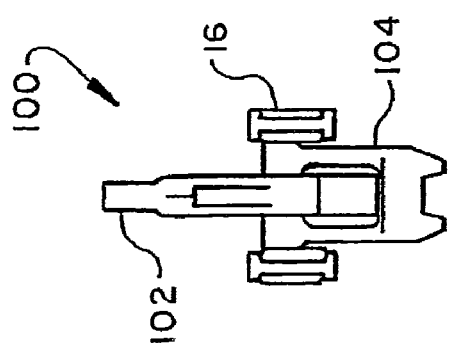
FIG. 13

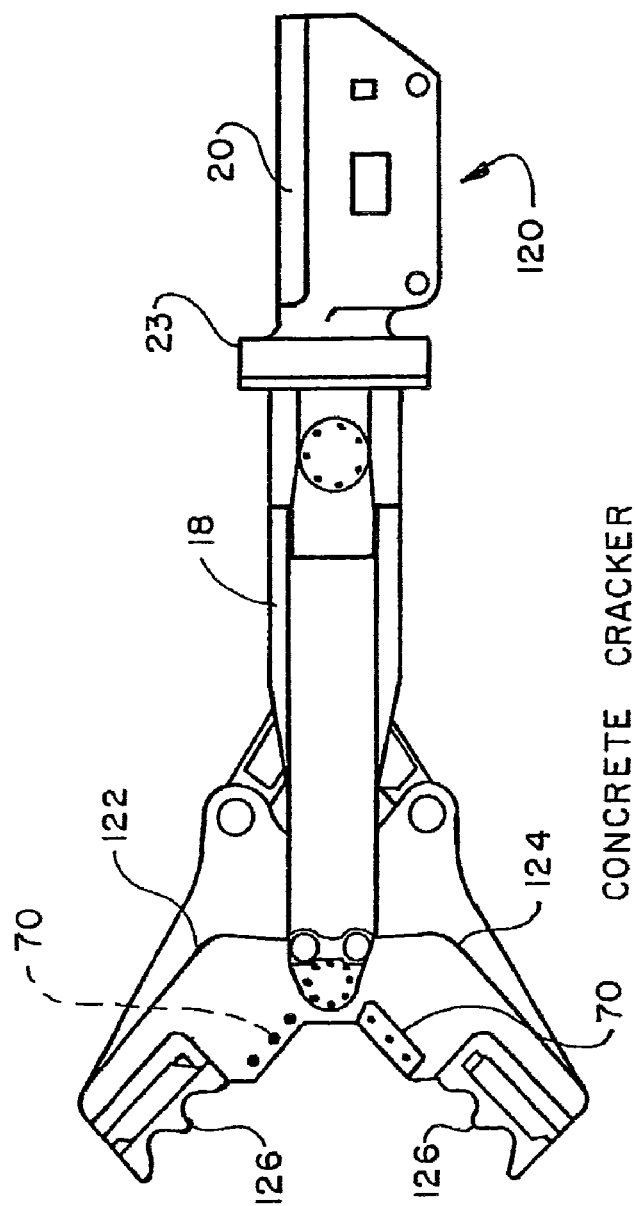
FIG. 14 CONCRETE CRACKER
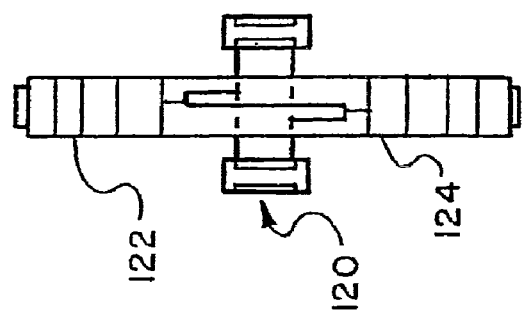
FIG. 15

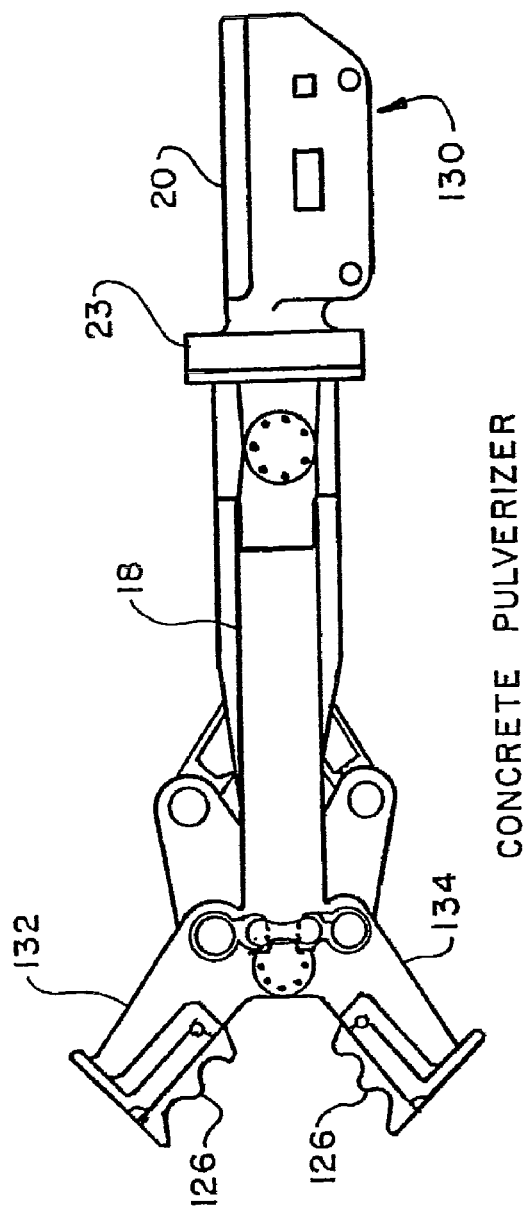
FIG. 16 CONCRETE PULVERIZER
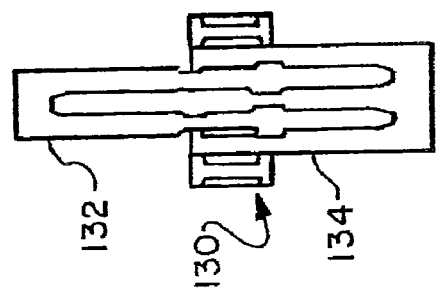
FIG. 17

WOOD SHEAR

IRON/RAIL CRACKER

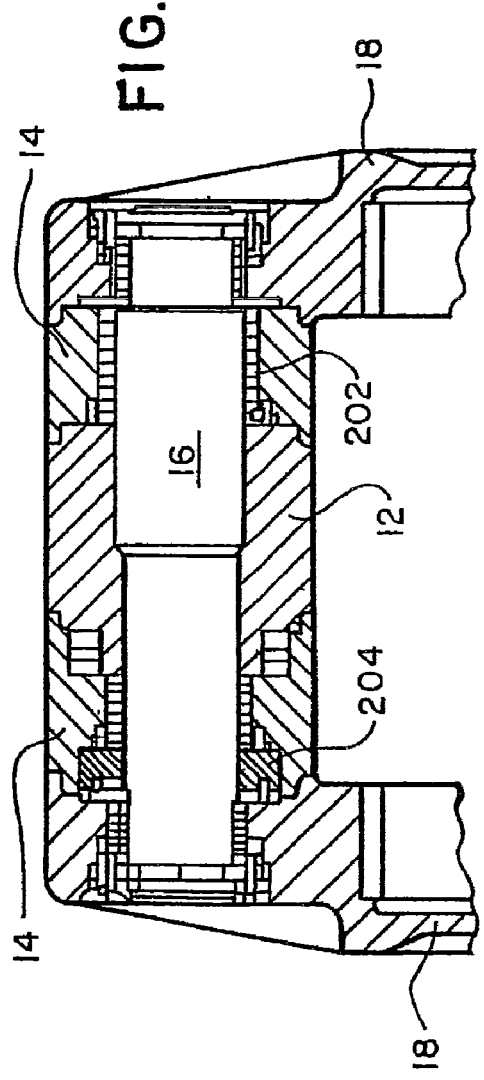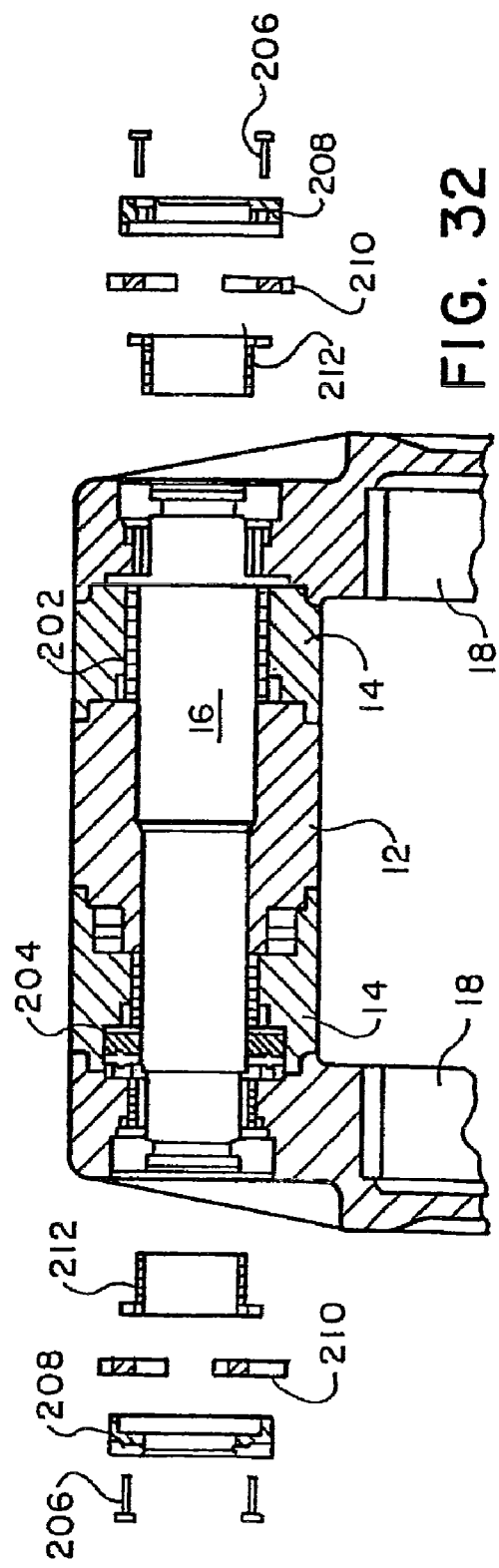

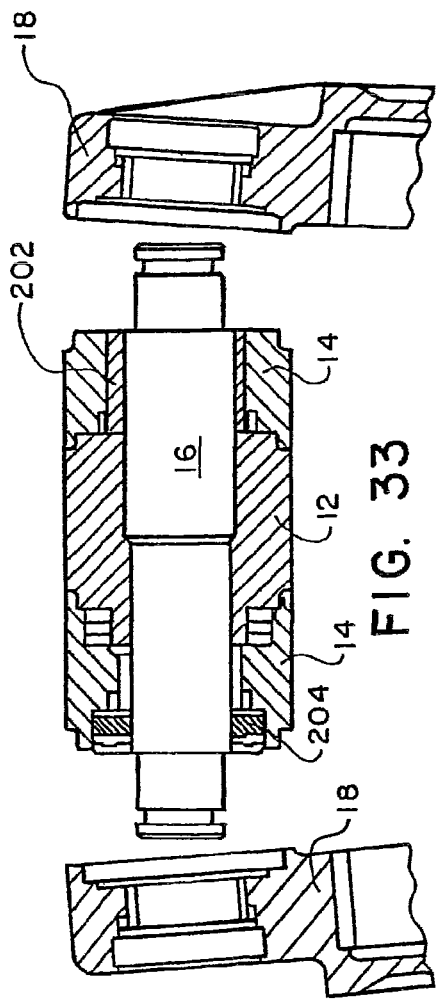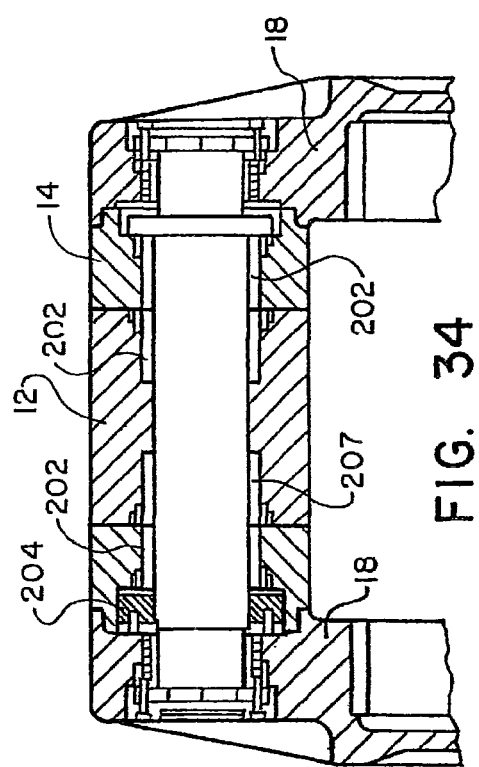
FIG. 33
FIG. 34

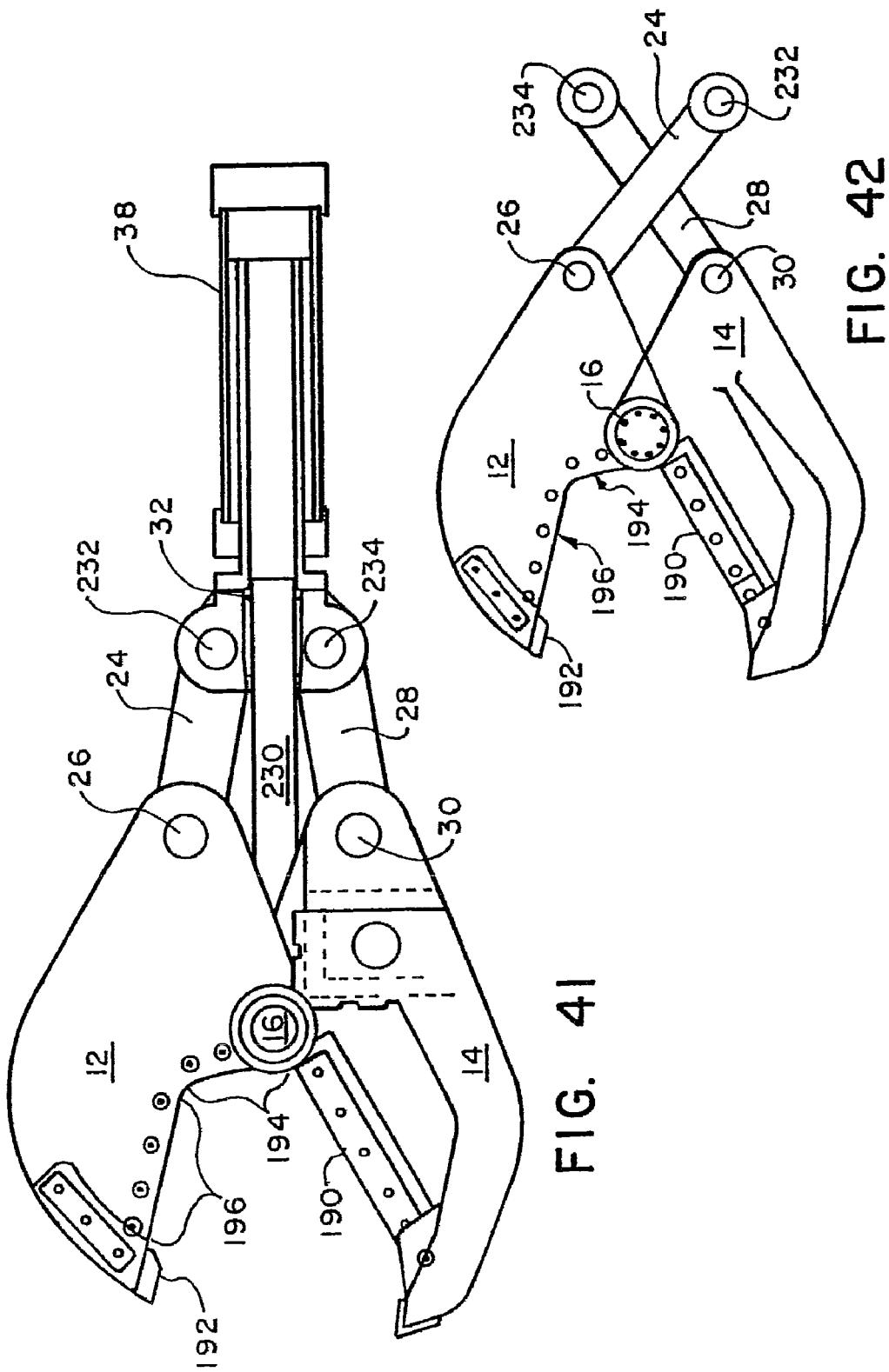

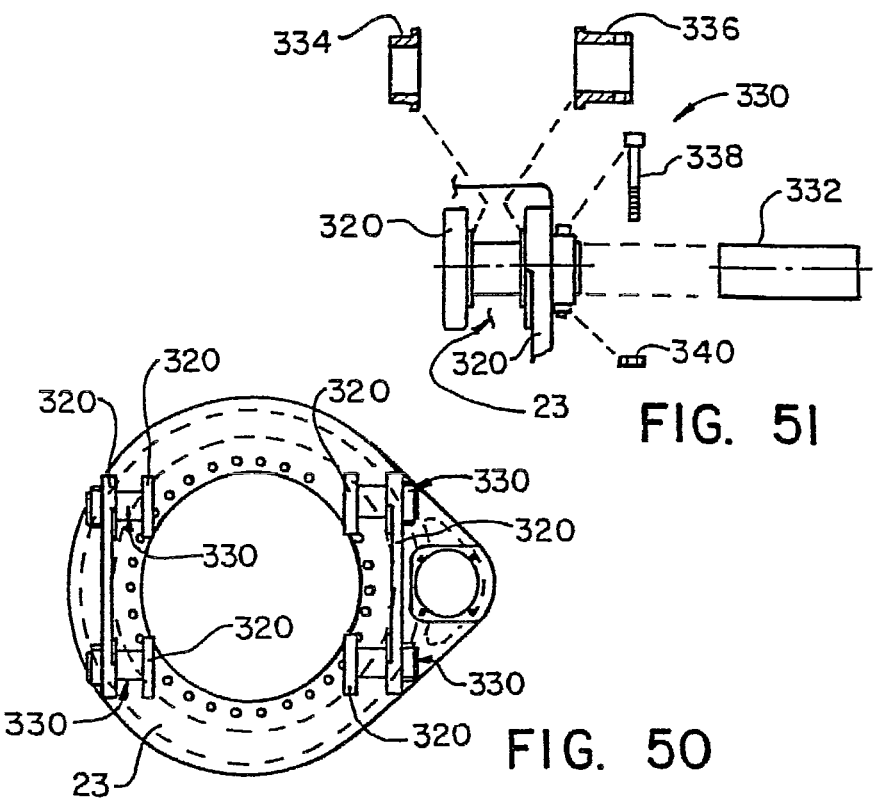
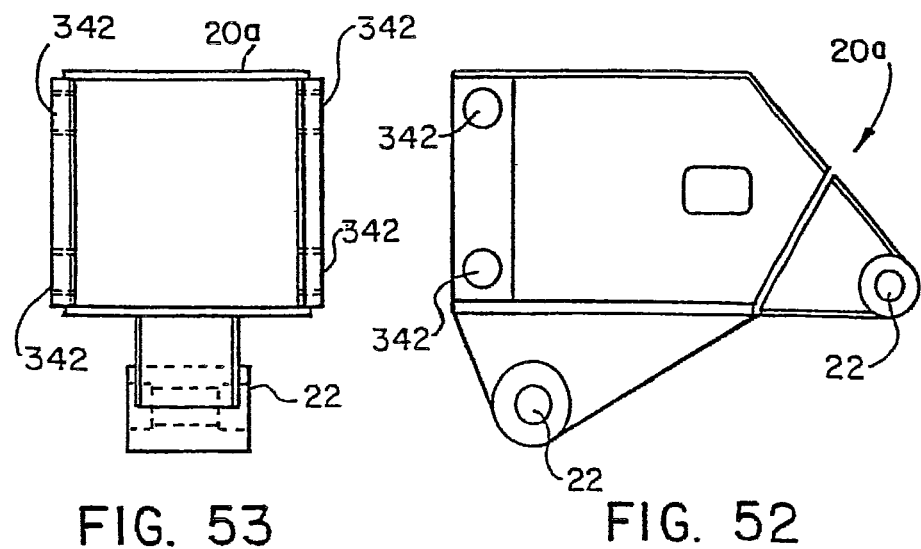

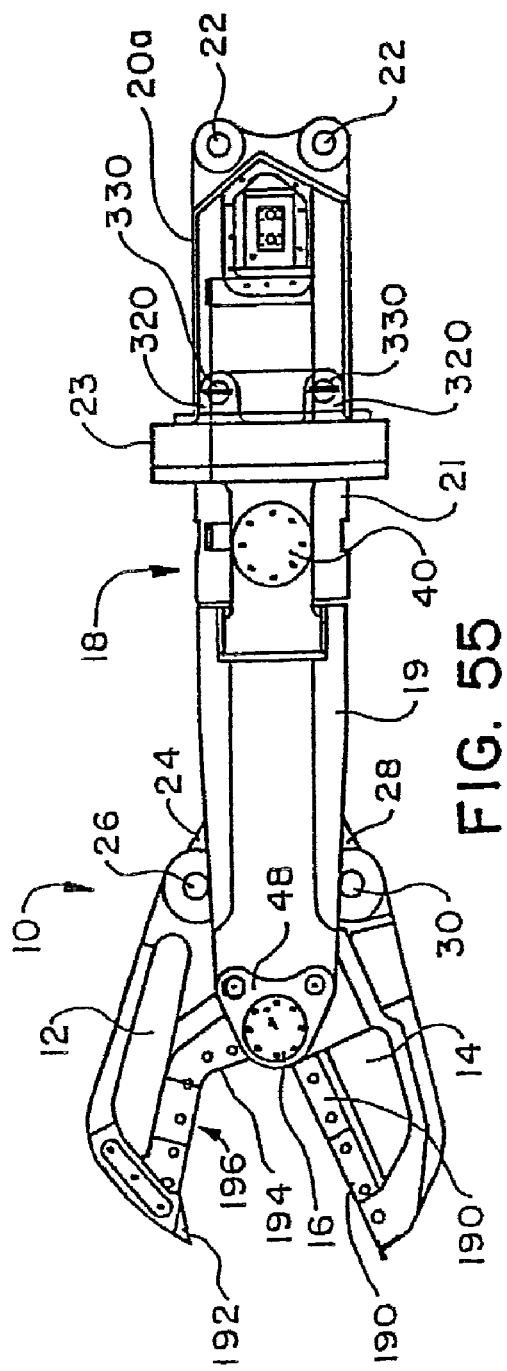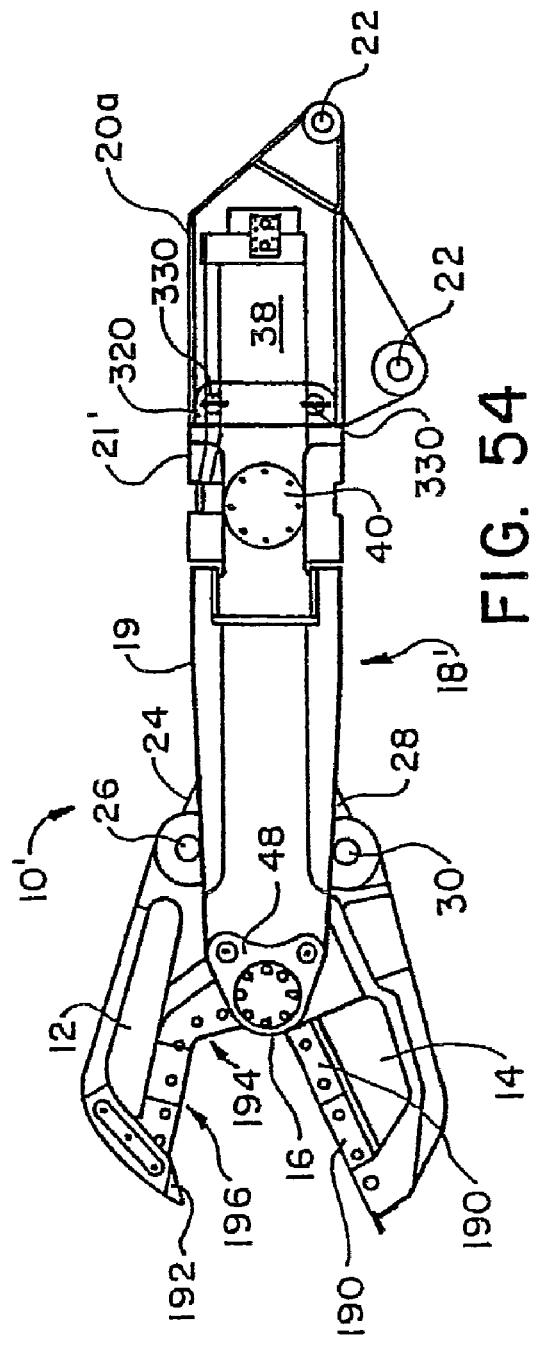

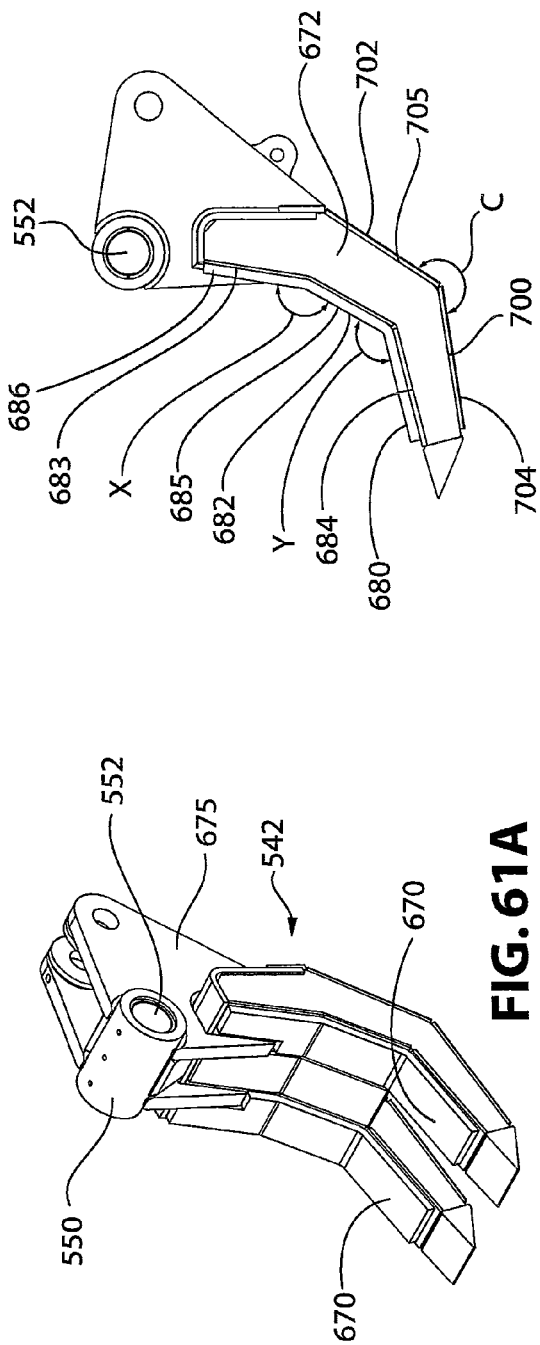
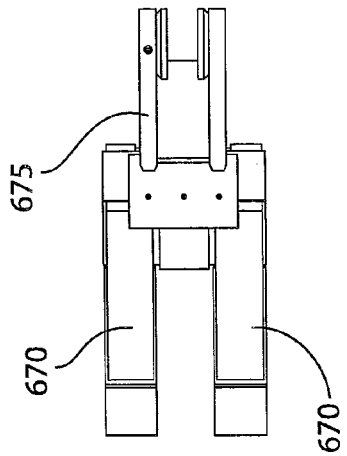
FIG. 61A  FIG. 61B  FIG. 61C

MULTIPLE TOOL ATTACHMENT SYSTEM WITH UNIVERSAL BODY WITH GRAPPLE

CROSS REFERENCE TO RELATED APPLICATIONS

This application is a continuation-in-part of U.S. application Ser. No. 11/520,510 filed Sep. 13, 2006, which is a division of U.S. application Ser. No. 11/101,265 filed Apr. 7, 2005, which is a division of U.S. application Ser. No. 10/089,481, now U.S. Pat. No. 6,994,284, issued on Feb. 7, 2006, which is the national phase of International Application No. PCT/US00/028367, filed Oct. 13, 2000, designating inter alia, the United States, which claimed the benefit of U.S. Provisional Application Nos. 60/159,869, filed Oct. 15, 1999, and 60/195,797, filed Apr. 10, 2000.

BACKGROUND OF THE INVENTION

1. Field of the Invention

The present invention relates to a tool attachment system for construction or demolition equipment which is adapted to be attached to a backhoe for attaching multiple tools, such as a heavy-duty metal cutting shear, a plate shear, a concrete crusher, a grapple or the like. More particularly, the present invention relates to a multiple tool attachment system for attaching tools having plural movable jaws.

2. Description of Related Art

The present application refers to demolition equipment; however, the equipment is also referred to as construction equipment, scrap handling equipment and the like. The description of demolition equipment or construction equipment is not intended to be restrictive of the equipment being referenced. Demolition equipment, such as heavy-duty metal cutting shears, grapples and concrete crushers, has been mounted on backhoes powered by hydraulic cylinders for a variety of jobs in the demolition field. This equipment provides for the efficient cutting and handling of scrap. For example, in the dismantling of an industrial building, metal scrap in the form of various diameter pipes, structural I-beams, channels, angles, sheet metal plates and the like, must be efficiently severed and handled by heavy-duty metal shears. Such shears can also be utilized for reducing automobiles, truck frames, railroad cars and the like. The shears must be able to move and cut the metal scrap pieces regardless of the size or shape of the individual scrap pieces and without any significant damage to the shears. In the demolition of an industrial building, concrete crushing devices, such as a concrete pulverizer or concrete crackers, are also used to reduce the structure to manageable components which can be easily handled and removed from the site. Wood shears and plate shears also represent specialized cutting devices useful in particular demolition or debris removal situations depending on the type of scrap. Also, a grapple is often utilized where handling of debris or work pieces is a primary function of the equipment. Historically, all of these pieces of equipment represent distinct tools having significant independent capital cost. Consequently, the demolition industry has tended to develop one type of tool that can have the greatest possible utility and application.

With regard to metal shears, one type of known shear is a shear having a fixed blade and a movable blade pivoted thereto. The movable blade is pivoted by hydraulic cylinder to provide a shearing action between the blades for severing the work pieces. Examples of this type of shear can be found in my prior U.S. Pat. Nos. 4,403,431; 4,670,983; 4,897,921; 5,926,958; and 5,940,971 which are incorporated herein by reference.

The prior art has also developed a variety of demolition tools utilizing a plurality of movable jaws. U.S. Reissue Pat. No. 35,432 and U.S. Pat. No. 5,060,378 both disclose heavy-duty metal cutting shears having a body and a pair of movable jaws mounted to the frame for pivoting about a common point. Each jaw includes a plurality of cutting inserts in shearing relation with the inserts on the other jaw, with one jaw forming a slot for maintaining the inserts in shearing relation to each other throughout the cutting movement. Each jaw is operated by an independent hydraulic cylinder. The jaw configuration provides a hook-shaped structure with one of the jaws having a cutting or piercing tip at the end thereof. However, these patents do not optimize the jaw structure for the purpose of cutting. Additionally, the independent cylinders increase the cost and prevent a compact shear design.

U.S. Pat. No. 5,359,775 discloses a metal cutting shear with a pair of movable jaws pivotally mounted to a frame with a pair of jaws operated off of a common piston extending between the jaws.

U.S. Pat. Nos. 4,838,493; 4,890,798; 5,044,569; 5,636,802; and 5,738,289 all disclose a variety of concrete crushers having a plurality of movable jaws operated through hydraulic cylinders. U.S. Pat. Nos. 4,903,408; 5,044,568; 5,199,658; 5,243,761; and 5,626,301 also disclose a variety of demolition equipment having a plurality of movable jaws.

The prior art does not provide a system for easily changing tools or a system which allows complete separate tools to efficiently share a common structure. Further, the prior art fails to optimize the jaw structure utilized in the individual tools, such as metal cutting shears, to maximize power and efficiency. Additionally, the prior art provides a complex arrangement for rotations of the tool and jaws without sufficient protection for any hydraulic cylinder powering the working jaws.

SUMMARY OF THE INVENTION

The object of the present invention is to overcome the aforementioned drawbacks of the prior art. It is a further object of the present invention to provide a multiple tool attachment system which is easily converted between a plurality of distinct tools. A further object of the present invention is to provide a demolition tool having a plurality of movable jaws which optimizes the jaw structure. A further object of the present invention is to provide a demolition tool which optimizes the ratio between the jaw and the jaw power structure to provide optimum power performance throughout the blade movement cycle. A further object of the present invention is to provide a demolition tool system that simplifies the construction of the tool system, including rotating tools. A further object of the present invention is to provide a method for designing a demolition tool and tool system.

The objects of the present invention are achieved by a multiple tool attachment system according to the present invention. The attachment system is adapted to be attached to demolition equipment, also referred to as construction equipment, scrap handling equipment and the like. The system includes a universal body attachable the demolition equipment, a hydraulic cylinder attached to the universal body, a pair of linkages adapted to be coupled with the hydraulic cylinder, and a plurality of demolition tool units each selectively, removably attachable to the body and the hydraulic cylinder.

Each tool unit includes a pair of pivotable blades or jaws adapted to be pivotally connected to the body and to the pair of linkages. In one embodiment, the tool unit includes a pair of movable blades pivoted together with a common pivot pin connecting the blades together, and a bridge housing coupled to the pivot pin providing a quick release system for attaching the tool set to the body.

In one embodiment of the invention, the universal body includes a guide slot extending longitudinally along the body. A slide member is received within the guide slot, with each linkage attached to the slide member and the piston cylinder arrangement attached to the body and coupled to the slide member for moving the slide member and the blades. The linkages may be attached to the slide member at a common point. Additionally, the linkages may have a common sleeve adapted to hold the linkages together when decoupled from the slide member. The universal body may be provided with pivotable sides and/or with side access panels to assist in repair, maintenance and tool changing.

The demolition equipment is provided with quick change features and is designed to optimize the cutting characteristics throughout the movement cycle. Specifically, the lengths of the linkages and the lengths of the relevant lever arms for each blade of a tool set may be set to be substantially equal or varied. In general, these jaw and link dimensions may be selected for a desired positioning of the power curve of the jaw to optimize the performance throughout the intended operating conditions. The jaw and link dimensions may be selected to shape or regulate the power curve in a desired manner. For example, the relative dimensions of the jaw sets may be selected to provide an increasing power curve throughout the blade closing motion or, alternatively, the relative dimensions of the jaw sets may be selected to have the power curve peak slightly before the end of the blade closing motion. In one shear of the present invention, the jaw depth and maximum jaw opening are also the same as the lever arm and linkage lengths. Additionally, the jaw design of the shear of the present invention is designed to perform the majority of the heavy cutting at the throat of the plural moving jaws. The concepts of the present invention can be incorporated into a guided single moving blade demolition tool.

In another embodiment, the jaw set is a grapple and the pivot pin supports the grapple jaws on each side of the bridge housings.

These and other advantages of the present invention will be clarified in the description of the preferred embodiments wherein like reference numerals represent like elements throughout.

BRIEF DESCRIPTION OF THE DRAWINGS

FIGS. 9-11a sequentially illustrate the disassembly of a tool unit mounted on the universal body of the construction tool system shown in FIG. 1;

FIG. 12 is a side view of a plate shear according to the present invention incorporated into the universal body of FIG. 1;

FIG. 13 is a front view of the plate shear illustrated in FIG. 12;

FIG. 14 is a side view of a concrete cracker according to the present invention incorporated into the universal body of FIG. 1;

FIG. 15 is a front view of the concrete cracker illustrated in FIG. 14;

FIG. 16 is a side view of a concrete pulverizer according to the present invention incorporated into the universal body of FIG. 1;

FIG. 17 is a front view of the concrete pulverizer illustrated in FIG. 16;

FIGS. 31-34 sequentially illustrate the disassembly of a tool unit mounted on a universal body illustrated in FIG. 28;

FIG. 41 is a schematic side view of a shear according to the present invention incorporated into a further modified universal body;

FIG. 42 is a schematic side view of a jaw portion of a shear according to the present invention;

FIG. 50 is a rear view of a rotary coupling of the shear in FIG. 49;

FIG. 51 is an enlarged view of a connector pin assembly for the rotary coupling in FIG. 50;

FIG. 52 is a side view of an adapter of the shear in FIG. 49;

FIG. 53 is a front view of the adapter of FIG. 52;

FIG. 54 is a side view, partially in section, of a shear similar to the shear of FIG. 49 without a rotary coupling in the body;

FIG. 55 is a side view, partially in section, of a shear similar to the shear of FIG. 49 and formed as a stick mounted type shear;

FIGS. 61A, 61B and 61C are a perspective, side and top view of the upper jaw illustrated in FIG. 59;

DESCRIPTION OF THE PREFERRED EMBODIMENTS

Figure 1:
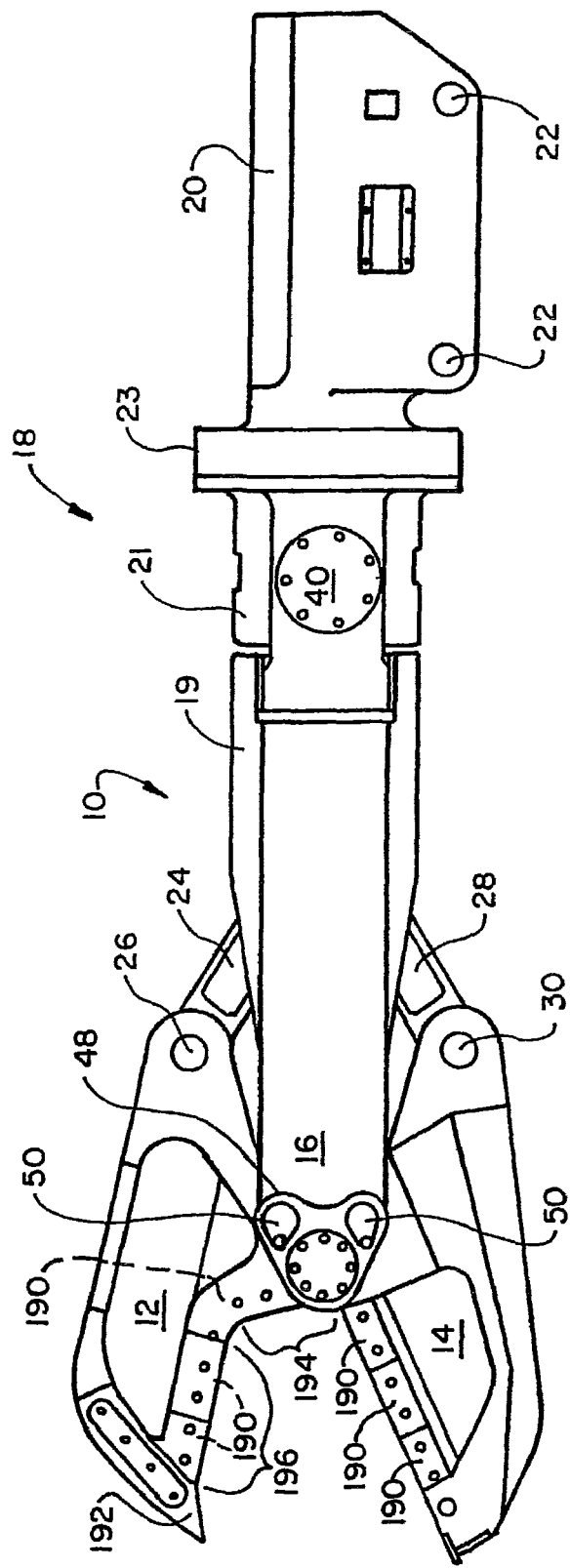
FIG. 1 is a side view illustrating a heavy-duty shear according to the present invention incorporated into a universal body for a construction tool system according to the present invention.

FIG. 1 illustrates a multiple tool attachment according to the present invention adapted to be attached to demolition equipment, such as a backhoe (not shown). The multiple tool attachment is adapted to connect one of a series of tools or tool units to the demolition equipment.

FIG. 1 illustrates a shear 10 coupled to the multiple tool attachment. The shear 10 includes a first blade 12 and a second blade 14 pivotally connected at a hub or main pin 16 to a universal body 18. The universal body 18 is referred to as the universal body 18 because it remains common to a series of tools or tool units in the attachment system according to the present invention. The universal body 18 is comprised of sides 19, a bearing housing 20 and a yoke 21. The main pin 16 provides a common pivot for both the first blade 12 and second blade 14.

The bearing housing 20 includes spaced mounting apertures 22 for attaching the universal body 18 to the demolition equipment in a conventional fashion through an adaptor (not shown). The adaptor will pivotally connect the universal body 18 to the demolition equipment and to a controlling piston for pivoting of the universal body 18. The adapter is intended to conform to the specific demolition equipment such that the shape of the adapter will differ depending on the specific demolition equipment utilized.

Figure 5:
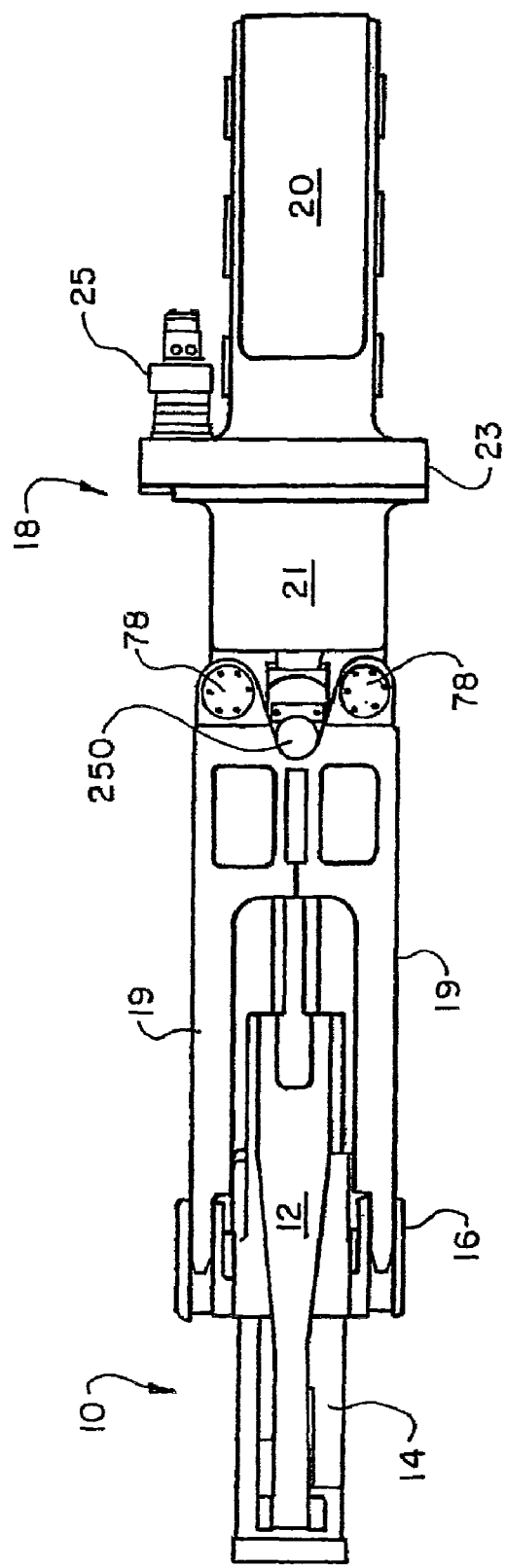
FIG. 5 is a plan view of the shear in FIG. 1.

A rotary coupling 23 is between the bearing housing 20 and the yoke 21. The rotary coupling 23 allows for a rotation of the remaining portions of the universal body 18 relative to the bearing housing 20 and the associated demolition equipment. Essentially, the rotary coupling 23 allows for 360 degree rotation for angular orientation of the universal body 18 and associated tool such as shear 10. A motor 25, as shown in FIG. 5, is attached to the bearing housing 20 and geared to the rotary coupling 23 for rotationally positioning the universal body 18.

Figure 2:
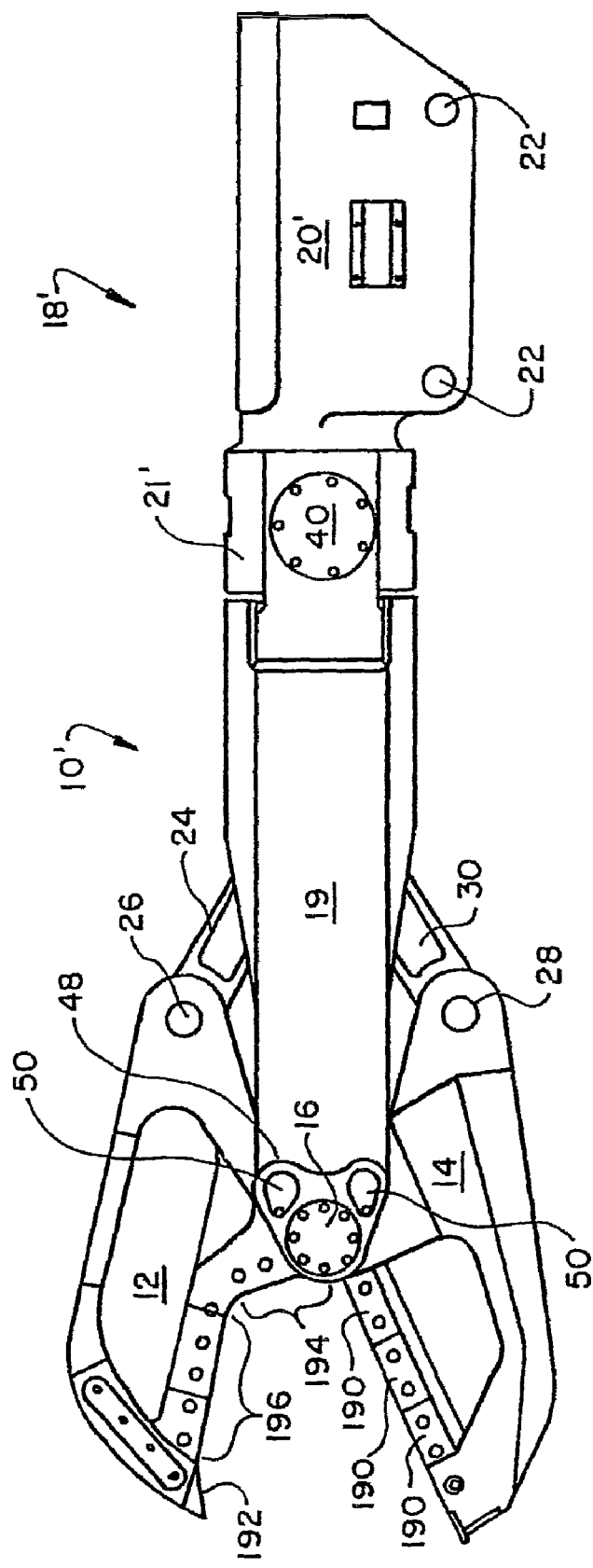
FIG. 2 is a side view of a shear similar to the shear of FIG. 1 without a rotator in the body.

FIG. 2 illustrates a shear 10' similar to shear 10 illustrated in FIG. 1. The shear 10' has a modified universal body 18' that does not include a rotary coupling attached to the bearing housing 20. A bearing housing 20' and a yoke 21' are of a unitary construction. The universal body 18' is appropriate where no rotation of the tool is desired.

Figure 3:
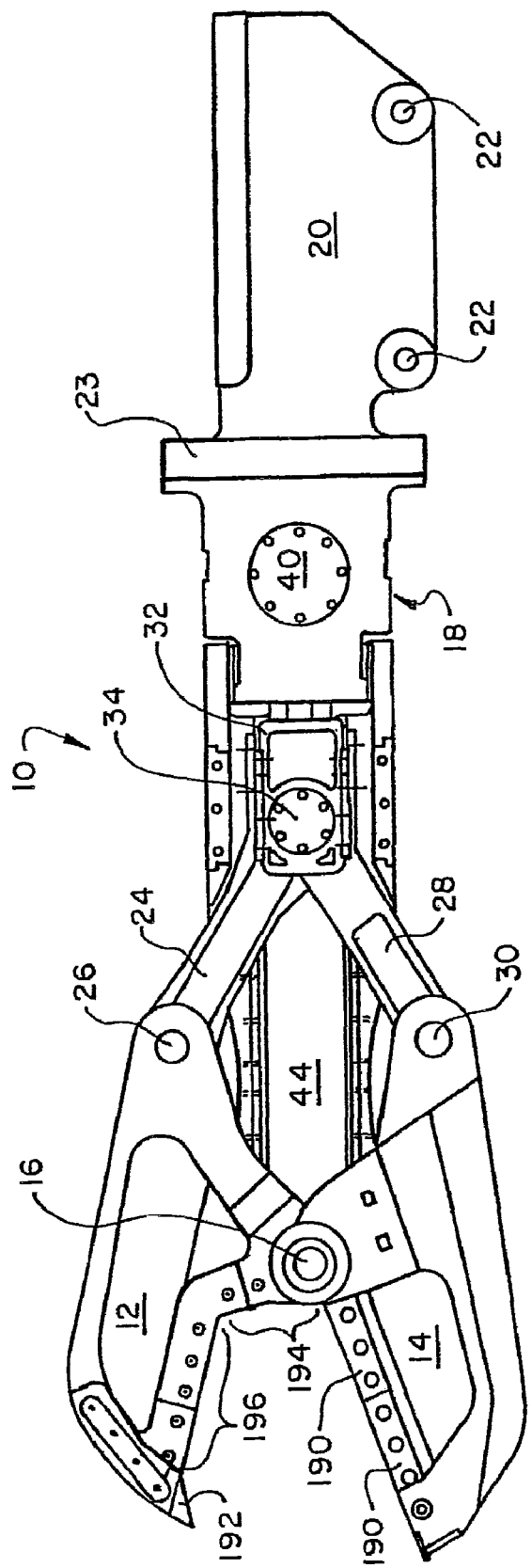
FIG. 3 is a side view of the shear in FIG. 1 with an outer side panel of the body removed.
Figure 24:
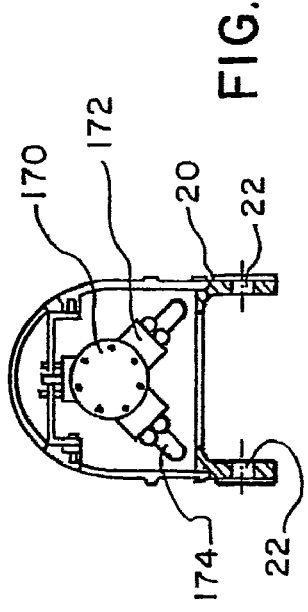
FIG. 24 is a sectional view of the universal body illustrated in FIG. 1 taken along line A-A of FIG. 5.
Figure 25:
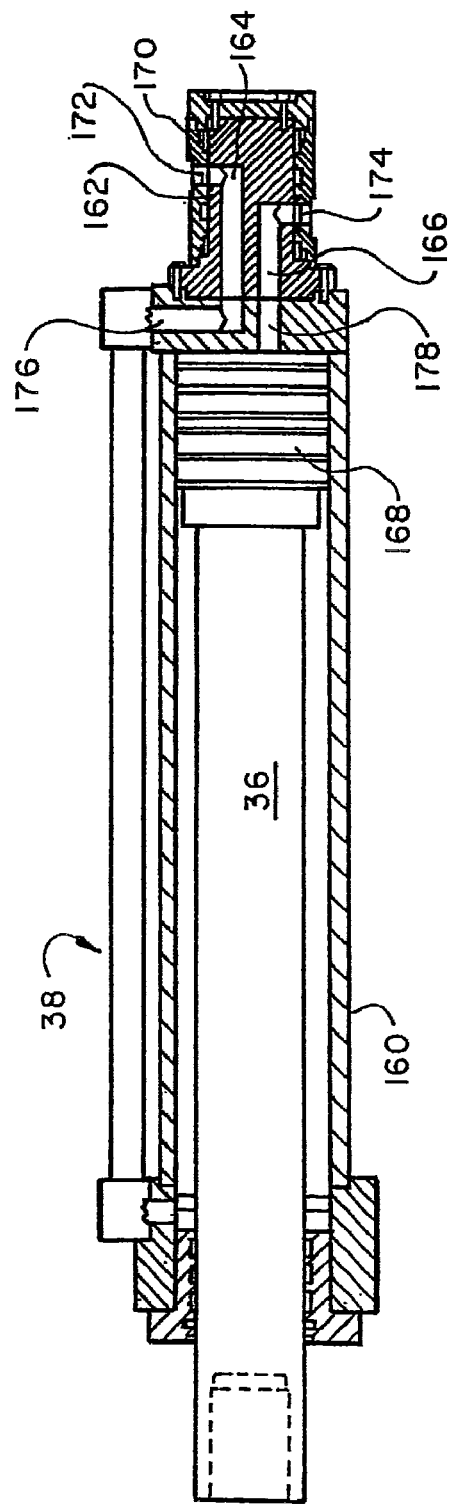
FIG. 25 is a sectional view of a hydraulic cylinder for the universal body of the present invention.

As best shown in FIG. 3, a first linkage 24 is pivotally connected at a removable pivot pin 26 to the first blade 12 and a second linkage 28 is pivotally connected at a removable pivot pin 30 to the second blade 14. The first linkage 24 and second linkage 28 are pivotally connected to a slide member 32 at a common pivot pin 34. The slide member 32 is attached to a piston rod 36, as shown in FIG. 25, which is movable by a double-acting hydraulic cylinder 38 (shown in the universal body 18 in FIG. 30). The hydraulic cylinder 38 is pivotally attached to the universal body 18 through a trunnion 40. The details of the hydraulic cylinder 38 are shown in FIGS. 24 and 25 and are described in detail below.

Figure 4:
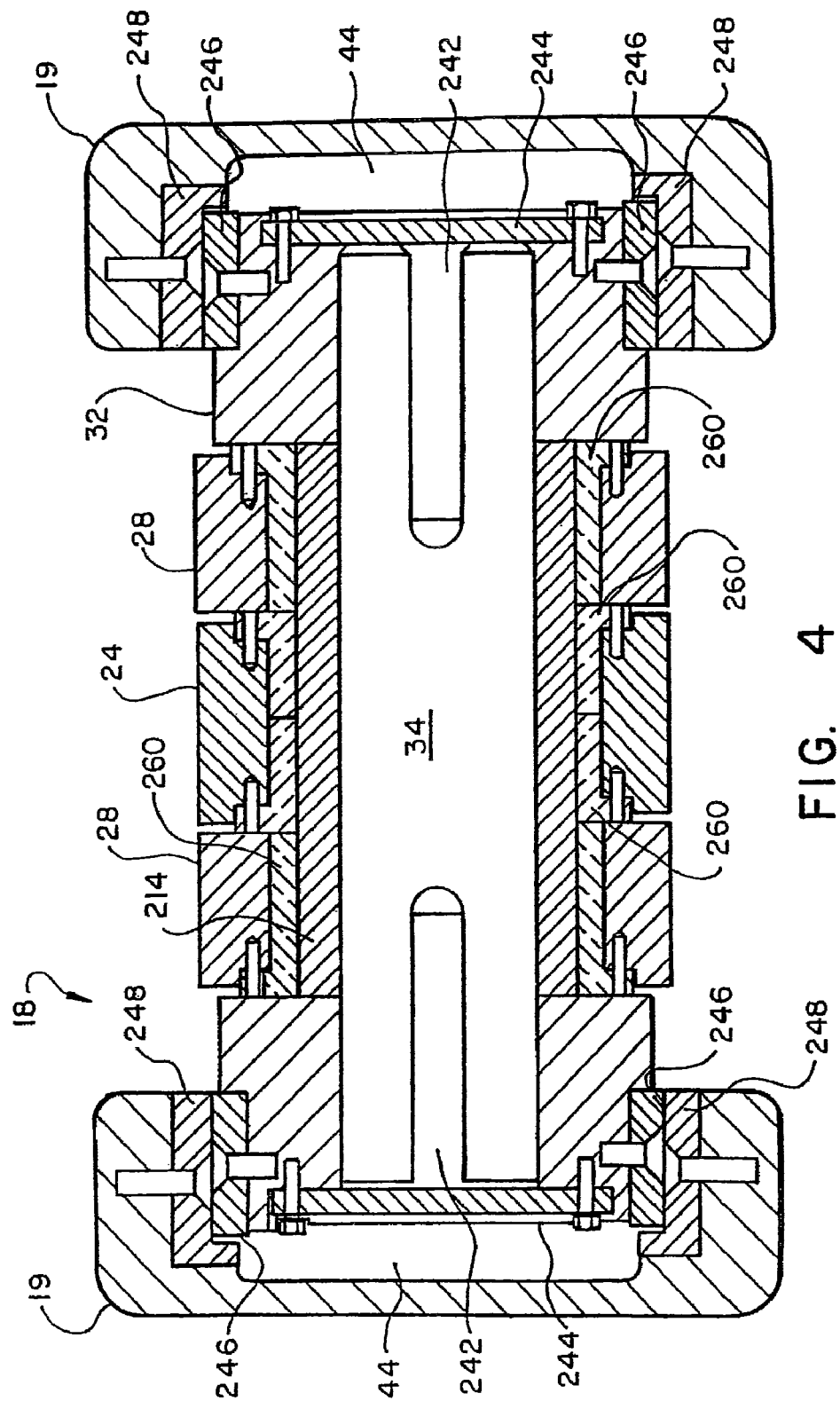
FIG. 4 is a sectional view taken along line A-A of FIG. 3.

As shown in FIGS. 3 and 4, sides 19 of the universal body 18 include a longitudinally extending guide slot or groove 44 which receives and guides the slide member 32 as shown in FIG. 4. The pivot pin 34 for connecting the first linkage 24 and second linkage 28 to the slide member 32 is aligned with the piston rod 36 and hydraulic cylinder 38 as illustrated in the figures. Having the linkages 24 and 28 attached to the slide member 32 at a common point in line with the hydraulic cylinder 38 helps maximize the power and efficiencies of the tool, such as shear 10, while minimizing the detrimental forces acting on the hydraulic cylinder 38. Additionally, the guiding of slide member 32 within the slot 44 resists torsional forces which otherwise disrupt the action of the tool and the operation of the hydraulic cylinder 38. The structure of the slide member 32 is shown in detail in FIGS. 4 and 6-7 and will be described in detail below.

A significant feature of the multiple tool attachment of the present invention is the quick change design incorporated into the connection between the jaw set of a specific tool and the universal body 18. This connection and the process of disassembly is shown in FIGS. 9-11a. A bridge housing 48 surrounds the main pin 16 and is utilized for quickly and easily attaching the main pin 16 and the associated jaw set to the universal body 18. Specifically, the sides 19 include receiving members 42 at the ends thereof which are adapted to be received in grooves in the bridge housings 48 for attaching the universal body 18 to the bridge housing 48. Keeper pins 50 are received through apertures 52 in the bridge housing 48 and the receiving members 42. Keeper screws or bolts 54 can be used to secure each keeper pin 50 to one bridge housing 48. In this arrangement, the outer bearing structure surrounding the main pin 16 will remain affixed even when the tool unit is removed from the universal body 18. This provides the advantage that all the bearing or rotating surfaces will be protected from dirt and grit even when the tool unit is disassembled.

Figure 8:
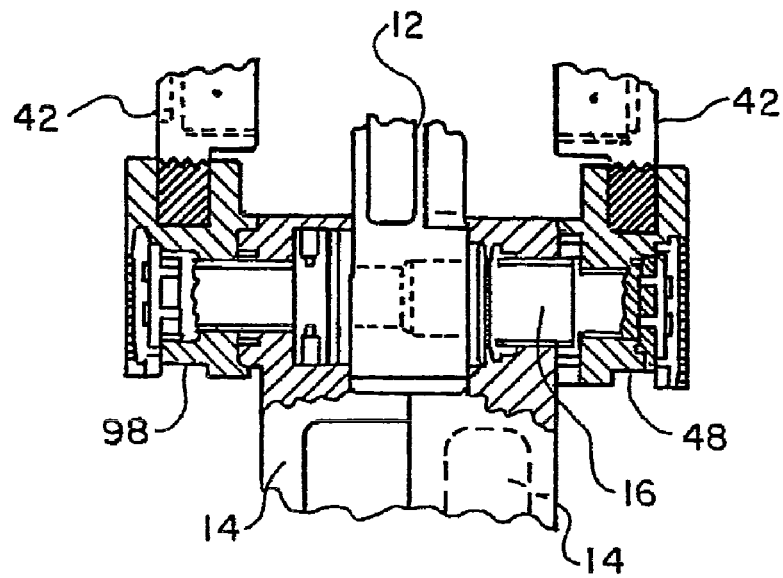
FIG. 8 is a plan view, partially in section, of a main shaft assembly of a tool unit mounted on the universal body of the construction tool system shown in FIG. 1.
Figure 56:
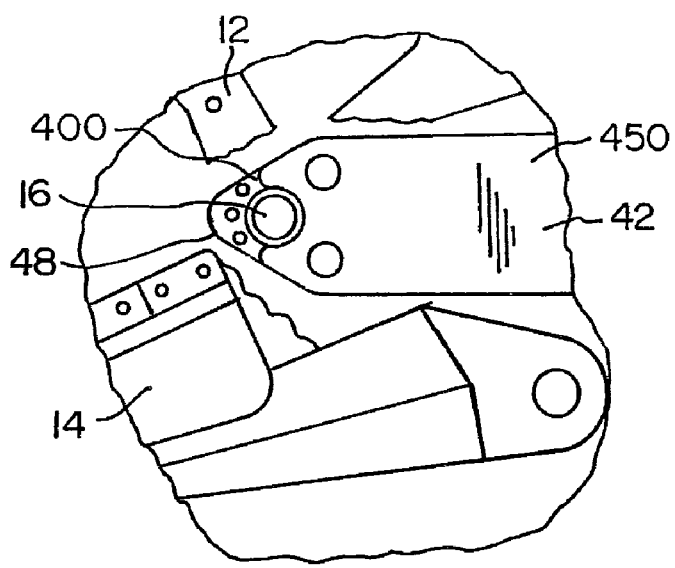
FIG. 56 is an enlarged view of the section labeled 56 in FIG. 1, but with the bridge housing 48 partially removed.

FIG. 56 illustrates a partial section view of FIG. 1 with the receiving member 42 engaging the bridge housing 48. Directing attention to FIGS. 1, 8, and 9, the first blade 12 and the second blade 14 pivot about the main pin 16, which extends through a bore 46 of the bridge housing 48 (FIG. 8). Directing attention to FIGS. 9 and 10, the bridge housing 48 has two opposing ends 400, 402. Each end 400, 402 has a pair of opposing plates 405, 406 defining a groove 408 therebetween having a support surface 410. One end 400 of the bridge housing 48 interacts with a first element 450 of the receiving member 42 while the other end 402 of the receiving member 42 interacts with a second element 452 of the receiving member 42. The ends 400, 402 of the bridge housing 48 are similar and the first element 450 and the second element 452 of the receiving member 42 are similar. For that reason, only details of the bridge housing end 400 and the receiving member first element 450 will be discussed. FIG. 56 illustrates the manner in which the first end 400 of the bridge housing 48 is secured to the first element 450 of the receiving member 42.

Figure 9:
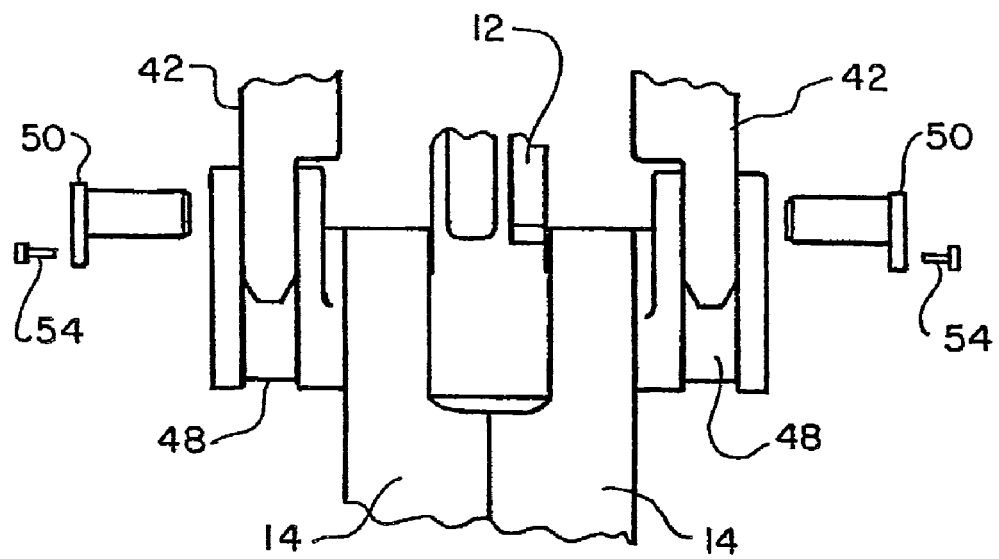
Figure 10:
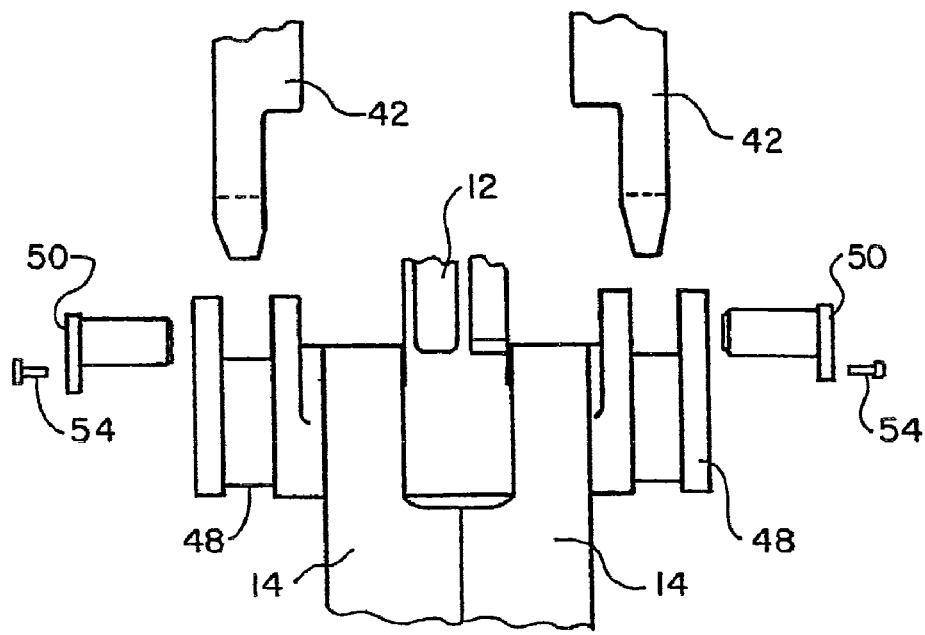
Figure 57:
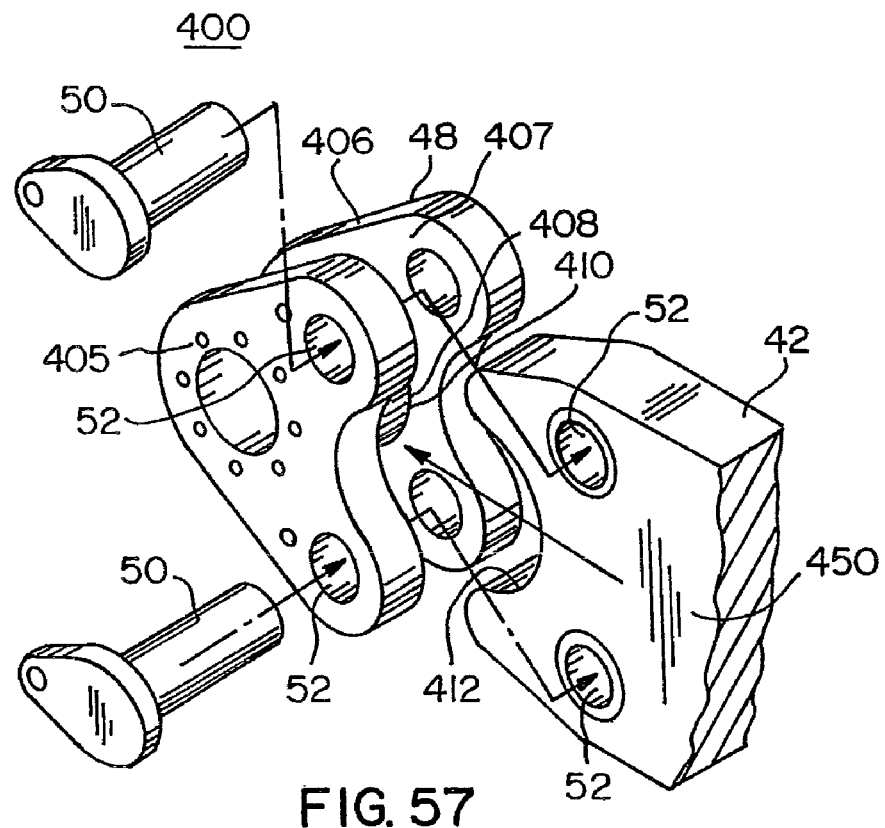
FIG. 57 is a perspective view of the quick change elements shown in FIGS. 9-11b.

Directing attention to FIGS. 9, 10, and 57, the first end 400 of the bridge housing 48 has a sleeve 409 within the groove 408 between the two opposing plates 405, 406. The sleeve 409 has a support surface 410. The first element 450 of the receiving member 42 has a complimentary engaging surface 412 which contacts the support surface 410 when the first element 450 of the receiving member 42 is placed within the groove 407 of the bridge housing end 400. In one embodiment, the support surface 410 and the complimentary engaging surface 412 are arcuate.

Figure 11A:
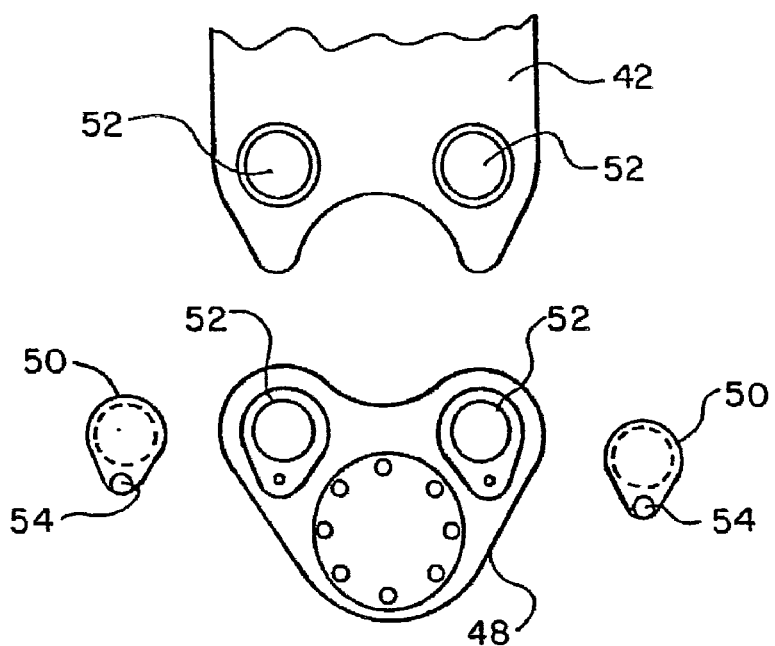
Figure 11B:
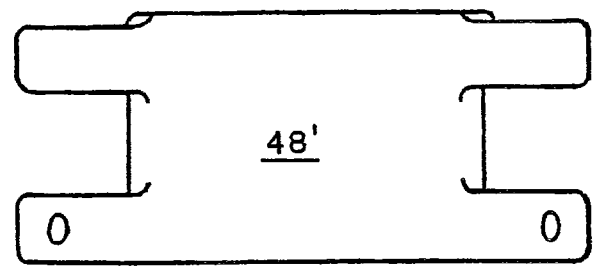
FIG. 11b is a front view of a modified bridge of the quick change system of the present invention.
Figure 11C:
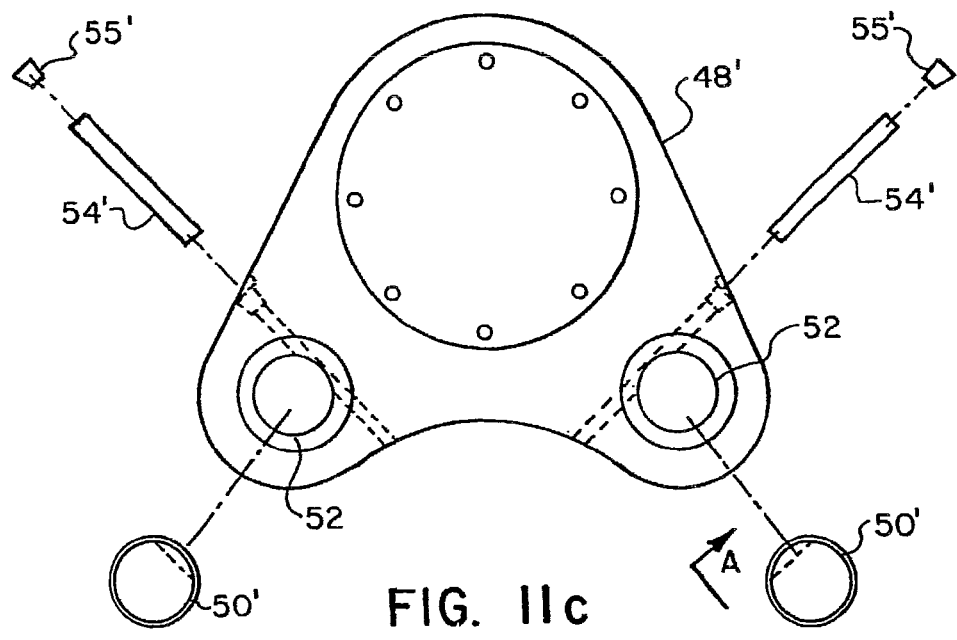
FIG. 11c is an exploded view of the quick change system used with the modified bridge of FIG. 11b.
Figure 11D:
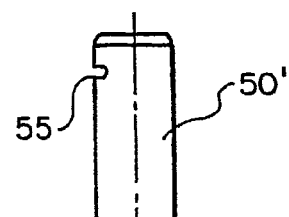
FIG. 11d is a side view of a keeper pin used in the quick change system of FIGS. 11b-c.

Directing attention to FIGS. 11a and 57, the first end 400 of the bridge housing 48 has apertures 52 extending therethrough. The first element 450 of the receiving member 42 also has apertures 52 extending therethrough such that when the first end 400 of the bridge housing 48 is properly positioned against the first element 450 of the receiving member 42, the apertures 52 are aligned and keeper pins 50 are thereafter inserted within the apertures 52 to secure the bridge housing 48 to the receiving member 42. The apertures 52 on the first end 400 of the bridge housing 48 are spaced apart and spaced about the main pivot pin 16. A modification of the quick connecting system is shown in FIGS. 11b-d. FIGS. 11b and 11c show a modified bridge housing 48' which receives keeper pins 50' in apertures 52 in the bridge housing 48'. The keeper pins 50' are held in place by a keeper 54' as shown in FIG. 11c. Specifically, the shaft of the keeper 54' is received in a locking groove 55 formed in the keeper pins 50' as shown in FIG. 11d. FIGS. 11b-d illustrate that various modifications may be made to the quick change system within the scope of the present invention. Each keeper 54' is held in place by a retainer 55', such as a threaded plug or the like.

The quick change design of the present invention allows the universal body 18 to accommodate a wide variety of tool units. For example, the shear 10 formed by the first blade 12 and second blade 14 can be replaced with a plate shear 100 illustrated in FIGS. 12 and 13 having distinct blades 102 and 104. The plate shear 100 is similar to shear 10 except that the jaw of blades 102 and 104 is specifically designed for cutting plate. The plate shear 100 is similar to the shear 10 in that it is specifically designed for cutting metal products.

Figure 18:
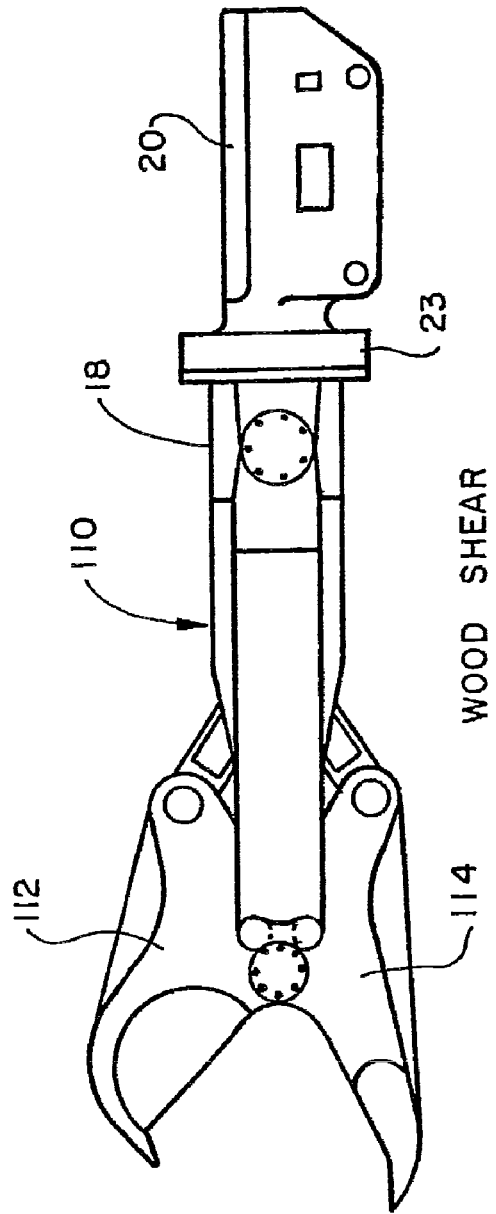
FIG. 18 is a side view of a wood shear according to the present invention incorporated into the universal body of FIG. 1.
Figure 19:
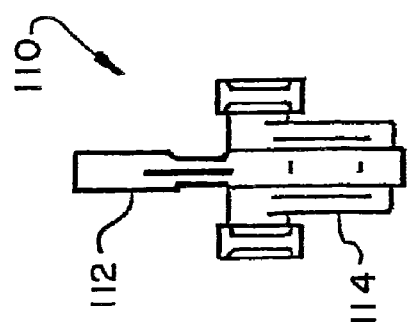
FIG. 19 is a front view of the wood shear illustrated in FIG. 18.

FIGS. 18 and 19 illustrate a wood shear 110 utilized with the universal body 18 of the present invention. Wood shear 110 includes blades 112 and 114 specifically designed for cutting wood products.

FIGS. 14 and 15 illustrate a concrete cracker 120 for use with the universal body 18. The concrete cracker 120 includes jaws 122 and 124 designed specifically for cracking concrete structures. Each jaw 122 and 124 includes concrete crushing inserts 126 at a distal end thereof cooperating with the crushing insert 126 on an opposite jaw 122 or 124 as well as cutting inserts 70 adjacent the main pin 16 which provide a shearing relationship with the cutting inserts 70 of the associated jaw 122 or 124.

FIGS. 16 and 17 illustrate a concrete pulverizer 130 for use with the universal body 18 of the present invention. The concrete pulverizer 130 includes jaws 132 and 134 associated with crushing of concrete. The jaws 132 and 134 include crushing inserts 126 cooperating with inserts 126 on an opposite jaw 132 and 134.

Figure 20:
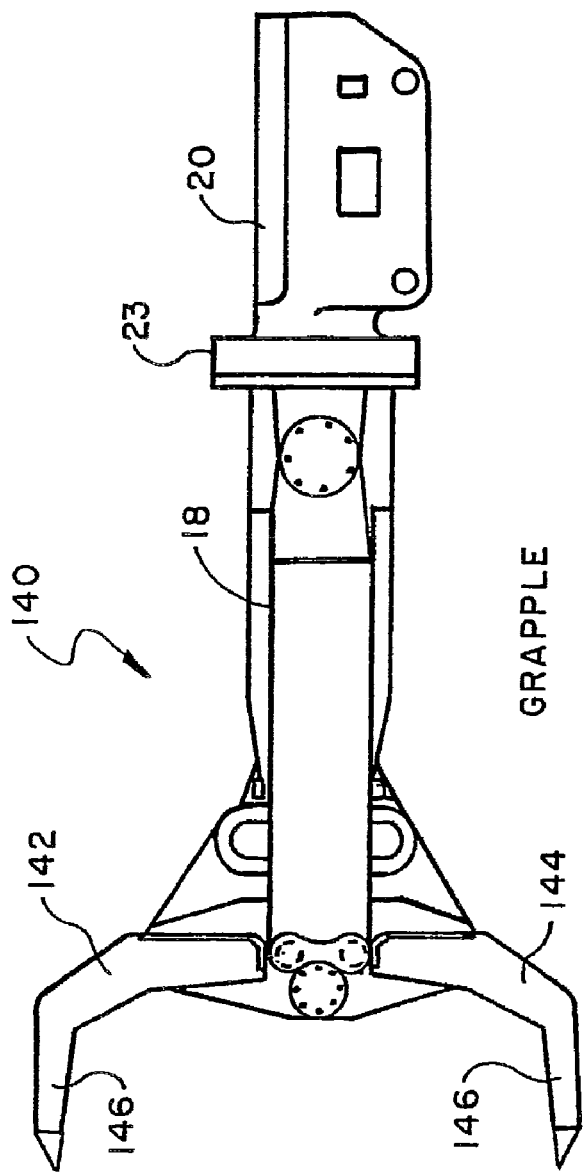
FIG. 20 is a side view of a grapple according to the present invention incorporated into the universal body of FIG. 1.
Figure 21:
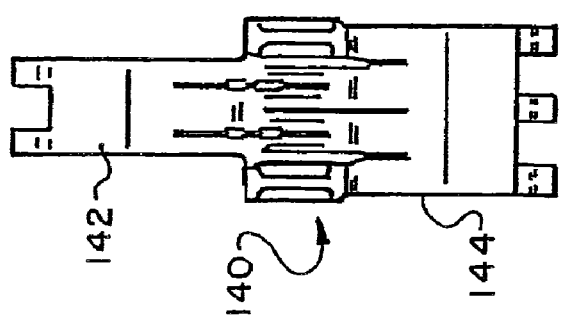
FIG. 21 is a front view of the grapple illustrated in FIG. 20.

FIGS. 20 and 21 illustrate a grapple 140 for use with the universal body 18 of the present invention. The grapple 140 includes jaws 142 and 144 having hook-shaped tines 146 extending from each jaw 142 and 144. The tines 146 of each jaw 142 and 144 are designed to extend between spaces of the tines 146 on the opposed jaw 142 or 144 such that the tines 146 can overlap in a closed position to completely encircle the work piece.

Figure 22:
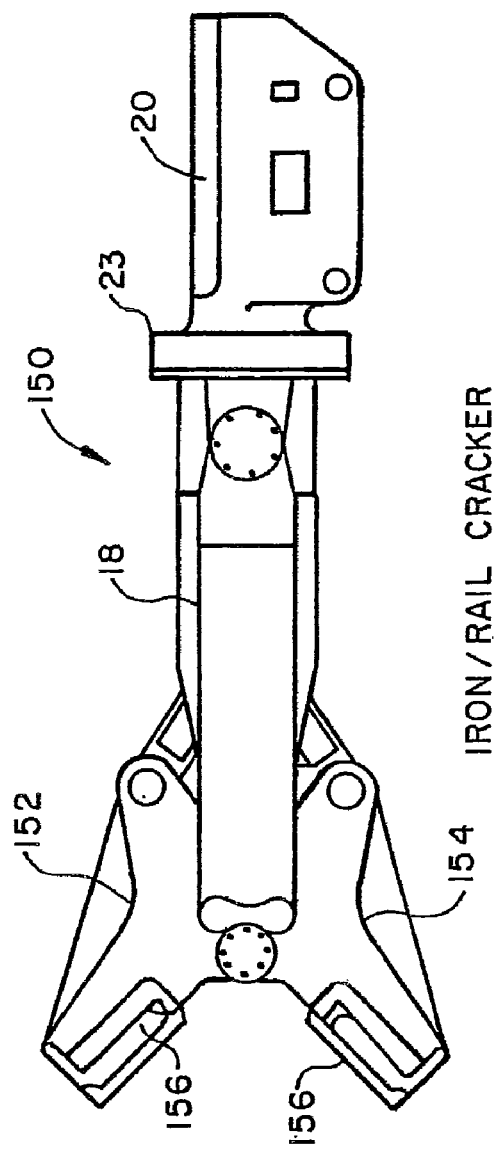
FIG. 22 is a side view of an iron and rail cracker according to the present invention incorporated into the universal body of FIG. 1.
Figure 23:
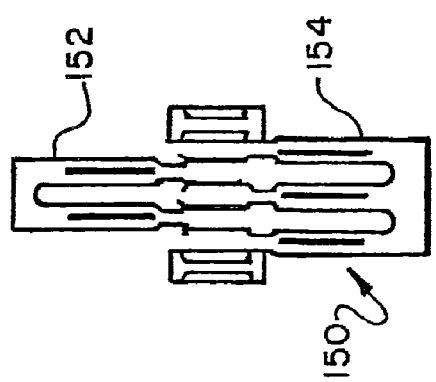
FIG. 23 is a front view of the iron and rail cracker illustrated in FIG. 22.

FIGS. 22 and 23 illustrate an iron and rail cracker 150 for use with the universal body 18 of the present invention. The iron and rail cracker 150 includes jaws 152 and 154 having interposed inserts 156 thereon. The iron and rail cracker 150 is designed to crack rail and cast iron products, such as engine blocks and the like.

The series of tools illustrated in the figures is merely intended to be representative of the tools which can be designed for use with the universal body 18. The quick disconnect feature provided by the bridge housing 48 on each tool facilitates the rapid tool change of the present invention. It will be appreciated that the linkages 24 and 28 must also be disconnected during the change. This is easily accomplished through removal of the respective pivot pins 26 and 30. Consequently the linkages 24 and 28 can be considered part of the universal body 18 since these are likely to be common to multiple tool sets. It is also possible to change out the linkages with the tool sets by either disconnecting the linkages 24 and 28 from the slide member 32 or disconnecting the slide member 32 from the hydraulic cylinder 38. This may be desired where a tool set requires a change in the linkage lengths. Different tools may have different respective linkage lengths.

Due to the rotation of the forward portions of the universal body 18 through the rotary coupling 23, the rotation must be addressed in the hydraulic cylinder 38 and the hydraulic lines leading thereto. The hydraulic cylinder 38 is provided as a combined hydraulic cylinder and rotary joint to accommodate the provision of the rotary coupling 23. As shown in FIGS. 24 and 25, the hydraulic cylinder 38 includes a cylinder housing 160 which is rotatable with the universal body 18 through the trunnion 40. The cylinder housing 160 includes a cylinder extension 162 attached thereto which includes hydraulic lines 164 and 166 appropriately coupled for driving opposite ends of a piston 168 within the cylinder housing 160. The piston rod 36 is attached to the piston 168. The cylinder extension 162 is received within a stationary housing 170 which is secured to the bearing housing 20. The stationary housing 170 includes hydraulic ports 172 and 174 communicating with respective hydraulic lines 164 and 166. As illustrated in FIG. 25, the hydraulic ports 172 and 174 are channels around the interior of stationary housing 170 which provides constant fluid communication between the hydraulic ports 172 and 174 and the associated hydraulic lines 164 and 166 throughout rotation of the cylinder extension 162 relative to the stationary housing 170. Hydraulic lines 176 and 178 extend from the ends of hydraulic lines 164 and 166 to the appropriate interior portions of the cylinder housing 160 as shown in FIG. 25. This design of the hydraulic cylinder 38 accommodates the provision of a rotary coupling 23 without the need for a separate rotary joint. This design also provides a far more compact arrangement for the universal body 18 than if a separate rotary joint were utilized.

Figure 26:
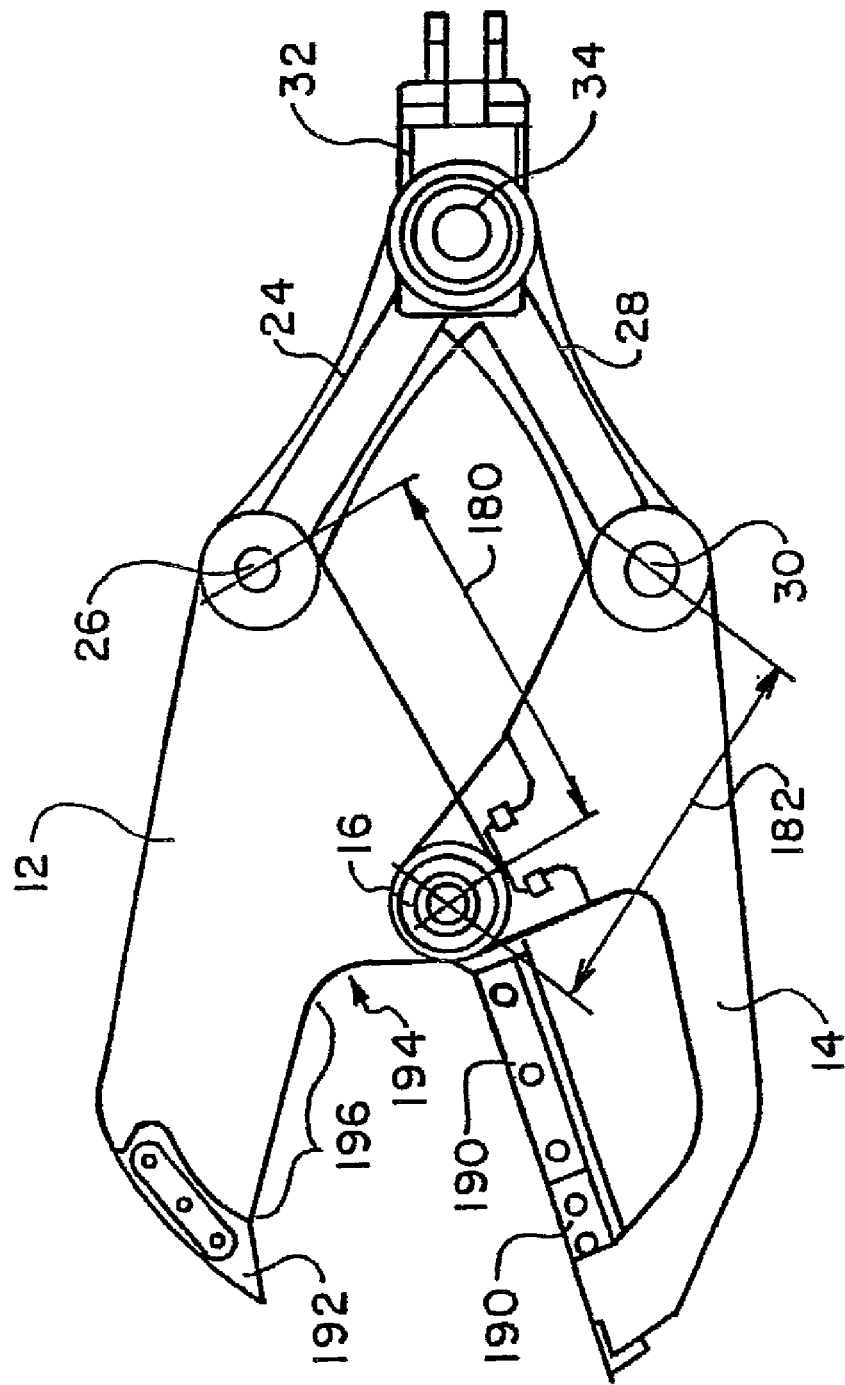
FIG. 26 is a side view schematically illustrating a jaw and a linkage arrangement of the shear of FIG. 1.
Figure 27A:
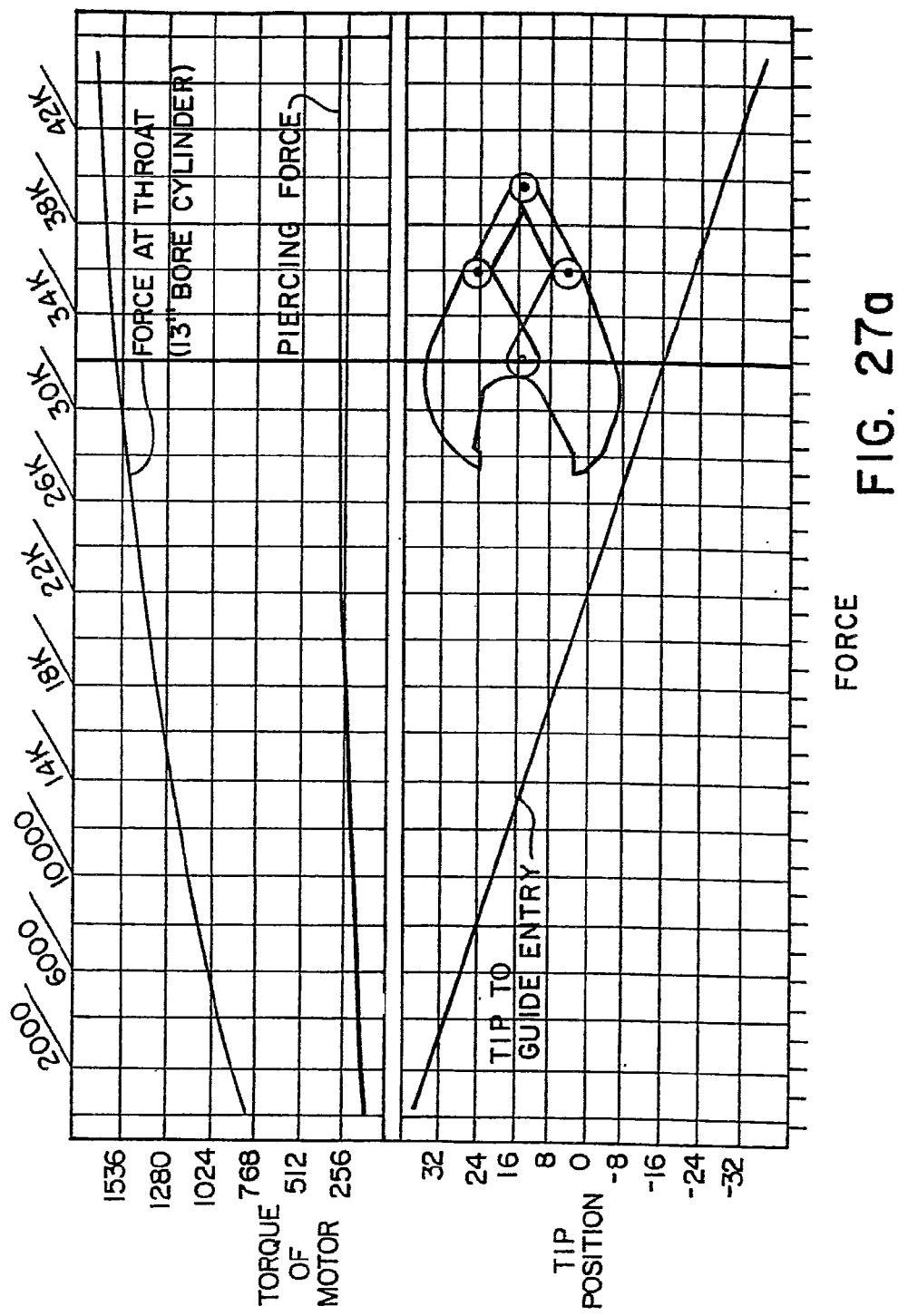
FIG. 27a is a graph of the power curve and relative jaw position for a shear having the linkage arrangement according to FIG. 26.
Figure 27B:
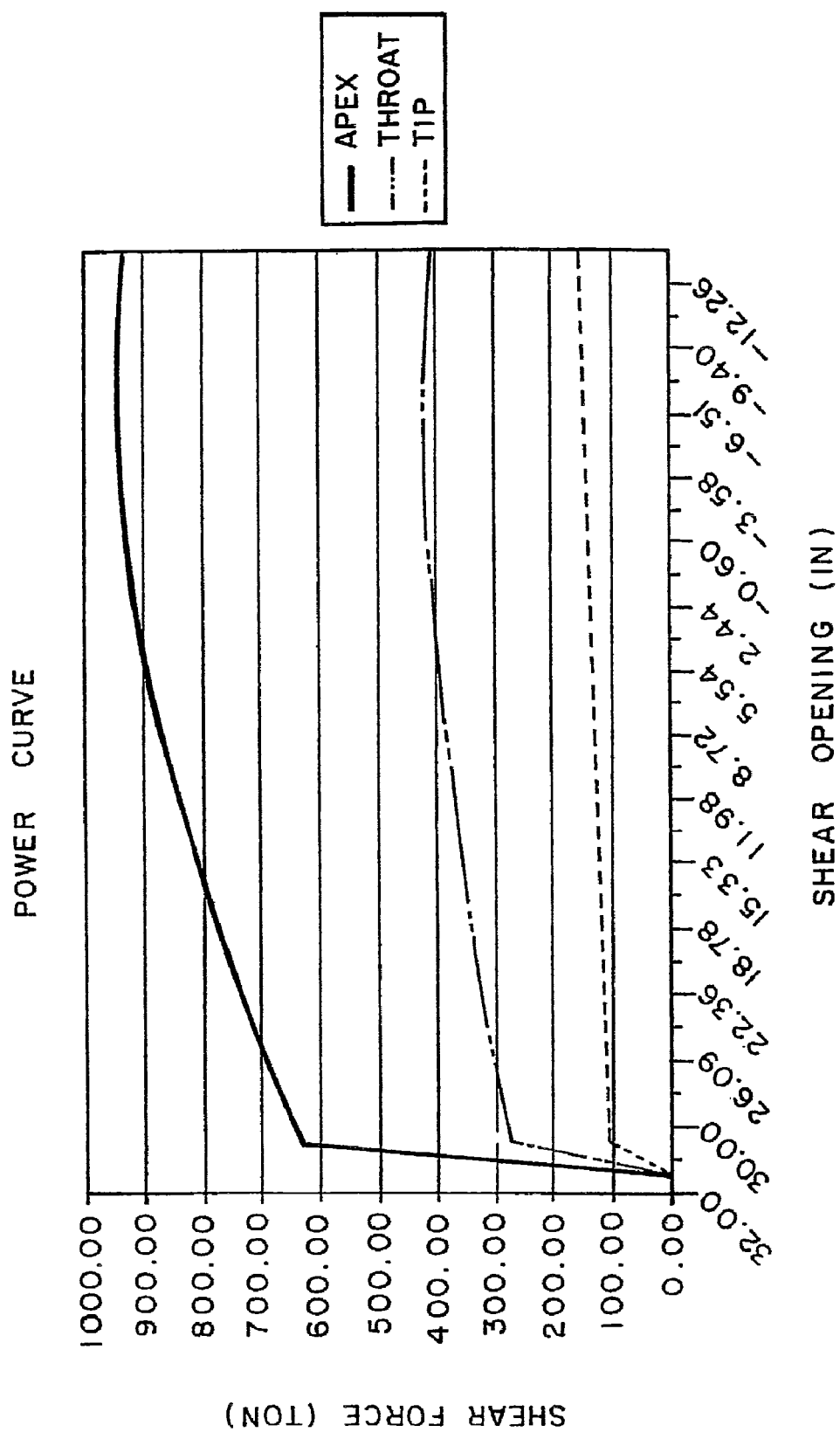
FIG. 27b is a graph of the power curve of a shear designed according to the present invention to have the power curve peak near the end of the jaw motion.

FIG. 26 illustrates the geometric relationships of the shear 10 according to the present invention. As illustrated in FIG. 26, the relevant parameters for the shear 10 include the lengths of each linkage 24 and 28 and lever arms 180 and 182 of the first blade 12 and second blade 14, respectively. The lever arms 180 and 182 for each blade 12 and 14 is the distance between the respective pivot pins 26 and 30 and the main pin 16. Further parameters include the jaw depth defined as the distance between the tip of the jaw and the innermost usable portion of that jaw and the maximum shear opening between the respective ends of the first blade 12 and second blade 14 as illustrated in FIG. 26. The shear 10 of the present invention optimizes the operational characteristics by analyzing and setting these dimensions to properly position the associated power curve. For example, in one embodiment, the power curve shown in FIG. 27a is set to continuously increase throughout the jaw movement by providing the shear opening, the shear jaw depth, the knife lever arm and links having substantially the same dimensional lengths. Maintaining these elements as substantially equal may help maximize the jaw opening as well as jaw depth and available shear tonnage. The present invention provides for the shaping and regulation of the power curve by selecting the relative dimensions accordingly. For example, FIG. 27b shows the power curve for one embodiment of the present invention in which the dimensions are selected so that the power curve peaks near the end of the cutting motion.

The cutting effort for each blade 12 or 14 as a function of the linkage geometry utilized in the shear 10 is calculated according to the following equation:

Cutting Effort=(Lever Arm)×(Cylinder Force/2)×sin (β)/ cos (θ); wherein β is the angle between the lever arm 180 and 182 and the associated linkage 24 or 28 and θ is the angle between the longitudinal axis of the cylinder 38 and the respective linkage 24 or 28.

The cutting force produced by the shear 10 at any location along the shear cutting edge can be calculated by dividing the cutting effort by the distance measured from the main pin 16 to the desired location along the blade 12 or 14. In order to optimize the geometric parameters of the shear 10 according to the present invention, the above parameters were varied and the resulting cutting torques where studied. The cutting torque is defined as the torque applied to the respective blade 12 or 14 about the main pin 16 by the hydraulic cylinder 38 through the piston rod 36, slide member 32 and associated linkage 24 or 28. This torque can be converted to a single force along the blade 12 or 14 by dividing the torque by the distance from the center of the main pin 16 to the desired location on the blade 12 or 14. The numerical value of the cutting torque is at its minimum when the blades 12 and 14 are fully open. The torque continuously increases in value as the blades 12 or 14 move to the fully closed position. FIG. 27a illustrates the favorable cutting force or power curve achieved with one shear of the present invention. FIG. 27a illustrates the force generated at the throat and piercing tip for the shear 10 through the various jaw positions which is shown in the lower portion of the graph. It is of particular importance to note that the power curve of this shear continually increases throughout the jaw closing cycle. The jaw position is graphed as the distance between the piercing tip and the lower jaw with the negative values reflecting when the portions of the upper jaw are moving through a slot in the lower jaw. The relative dimensions of the jaw parameters can be selected to vary the power curve as desired. For example, it may be advantageous to have the power curve peak slightly before the end of the jaw cycle when the maximum cutting forces are needed such as shown in FIG. 27b. Providing the linkage lengths slightly greater than the lever arms may be used to achieve this design.

A review of the effect of changing the relevant parameters will clarify the advantages of the design of the shear 10 of the present invention as well as the tool design method of the present invention. Increasing the length of the lever arm 180 or 182 of the respective blade 12 or 14 results in the increased values of cutting torque for all positions of the blade 12 or 14 from fully open to fully closed. However, the length of the respective lever arm 180 and 182 is, of course, limited by the desired overall dimensions of the shear 10. Varying the length of the linkages 24 and 28 has various effects on the cutting torque. If the linkages 24 and 28 are longer than the respective lever arms 180 and 182, the cutting torque curve versus the blade 12 and 14 position will increase in value until reaching a peak and then decreasing until the blades 12 and 14 are closed. One embodiment of the present invention utilizes this concept to position the maximum cutting torque near the end of the jaw moving cycle. If the length of the linkages 24 and 28 is shorter than the respective lever arms 180 and 182, the torque value will continuously increase from the open to the closed position. As the length of the linkage arms 24 and 28 increases, the value of the cutting torque at the open position increases and the value of the closed position decreases. Having the linkages 24 and 28 substantially the same length as the lever arms 180 and 182 results in one shear design which considers all of the factors to be balanced.

The hydraulic cylinder 38 also has an effect on the power of the associated shear 10. Increasing the diameter of the hydraulic cylinder 38 results in an increased cutting torque for all the blade positions (12 and 14) and also increases the open/closed cycle time for the shear 10. The size of the hydraulic cylinder 38 is effectively determined by the size of the shear 10 and the operating conditions desired.

In addition to the lengths of the linkages 24 and 28 and the length of the respective lever arms 180 and 182, the value of the angles θ between the respective linkages 24 and 28 and the longitudinal axis of the hydraulic cylinder 38, and an angle φ between the lever arm 180 and 182 and the longitudinal axis of the hydraulic cylinder 38 will depend on the initial distance between the pivot pin 34 and the main pin 16 in the fully open position. To allow for the needed pin diameters, required bushings and the like, the initial values of these angles should be at least 20 degrees. Due to the nature of the force transmission at pivot pin 34 and slide member 32, the final value of these angles will be less than 90 degrees and should be approximately 80 degrees.

The initial distance between pivot pin 34 and main pin 16 is limited by two physical limitations. First, the distance must be less than the sum of the lengths of the respective lever arm 180 and 182 and linkage 24 or 28 by enough to allow the angles θ and φ discussed above to be at least about 20 degrees in the open position. Second, this distance must be large enough so that the pivot pin 34 will not run into the main pin 16 at the closed position. Decreasing the length of this initial distance decreases the cutting torque at all positions.

Another issue to review is the total jaw rotation angle. Increasing the size of the initial jaw opening increases the angular rotation necessary to go from the open position to the closed position. However, increasing this rotational angle also has an effect on the cutting torque curve. Increasing the total rotation angle causes an increase in the cutting torque when the jaws are almost fully open and a decrease in the cutting torque when in the fully closed position. Balancing all of the above considerations in the design of the shear 10 of FIG. 1 results in the shear opening, jaw depth, lever arm and linkage length being all substantially the same dimensional length. This ratio works for shears of all sizes such that the specific value of this dimensional length will depend upon the size of the shear desired. This relationship between the linkage length and the lever arm may also be maintained for the various tools illustrated in FIGS. 12-23. The other relationships may be altered due to jaw structure changes.

Another important aspect of the present invention is the jaw structure of shear 10. The cutting edge of the first blade 12 is formed of a plurality of removable cutting inserts 190 removably attached to the first blade 12 by bolts or the like as well-known in the art. These inserts 190 may be indexable, meaning that the inserts 190 may be removed and rotated to provide new cutting edges as one cutting edge is worn. The first blade 12 includes a piercing tip 192 at a distal end of the first blade 12. The piercing tip 192 is also a removable cutting insert. However, the piercing tip 192 is intended to primarily make a cut transverse to the cut supplied by the cutting inserts 190. Specifically, the primary cut of the piercing tip 192 would be extending into and out of the illustration in FIG. 1. Additionally, the cutting inserts 190 along the first blade 12 are positioned in a hook shape to provide a first cutting portion 194 and a longer second cutting portion 196 positioned between the first cutting position 194 and the piercing tip 192. The shear 10 is designed so that the first cutting portion 194 is significantly less than and preferably approximately one-half of, the length of the second cutting portion 196. The second blade 14 includes a plurality of cutting inserts 190 which are positioned in shearing relation with the cutting inserts 190 and piercing tip 192 to provide the shearing action for the shear 10. The second blade 14 provides a slot for the first blade 12 to extend through during the shearing action with the slot helping to maintain the cutting inserts 190 in shearing relation. The jaw design of the first blade 12 and second blade 14 in the shear 10 is constructed to help move material to be severed to the throat area adjacent the main pin 16 where the cutting forces are the highest. Having the piercing tip 192 sever the work piece in a direction transverse to the cutting of the first cutting portion 194 and second cutting portion 196 will help draw the material back to the throat. Additionally, the hook shape, i.e., the angle, between the first cutting portion 194 and the second cutting portion 196 will also serve to pull the material back to the throat area. Finally, the provision of the first cutting portion 194 having a dimension significantly less than the second cutting portion 196 will further assure that the material is pulled closer to the throat for cutting. This is believed to provide a significant improvement over the jaw designs of existing shears with plural movable blades and compliments the power curve associated with the shear design to magnify the effective shearing force. It is also within the scope of the present invention that different shapes for the piercing tip 192 may be utilized for different types of material. Specifically, a piercing tip having a sharper or shallower angle when viewed from the side may be more or less appropriate for distinct types of work pieces.

FIG. 5 additionally illustrates that the sides 19 of the universal body 18 are pivoted to the yoke 21 through side pivots 78. This allows for easy replacement of the first and second blades 12 and 14 with the associated linkages 24 and 28, if desired. The pivotable sides 19 of the universal body 18 can be secured together by bolts or other fastening members. A rectangular tie bar 79 is positioned between the pivotable sides 19 through which the securing bolts extend. The tie bar 79 helps to maintain structural integrity of the universal body 18.

Figure 29:
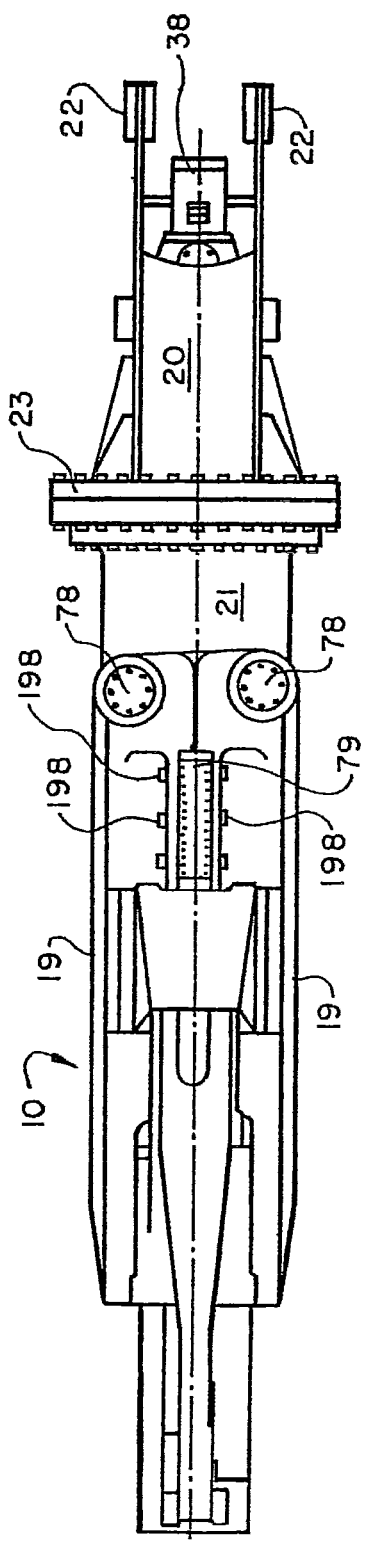
FIG. 29 is a top view of the shear illustrated in FIG. 28.
Figure 28:
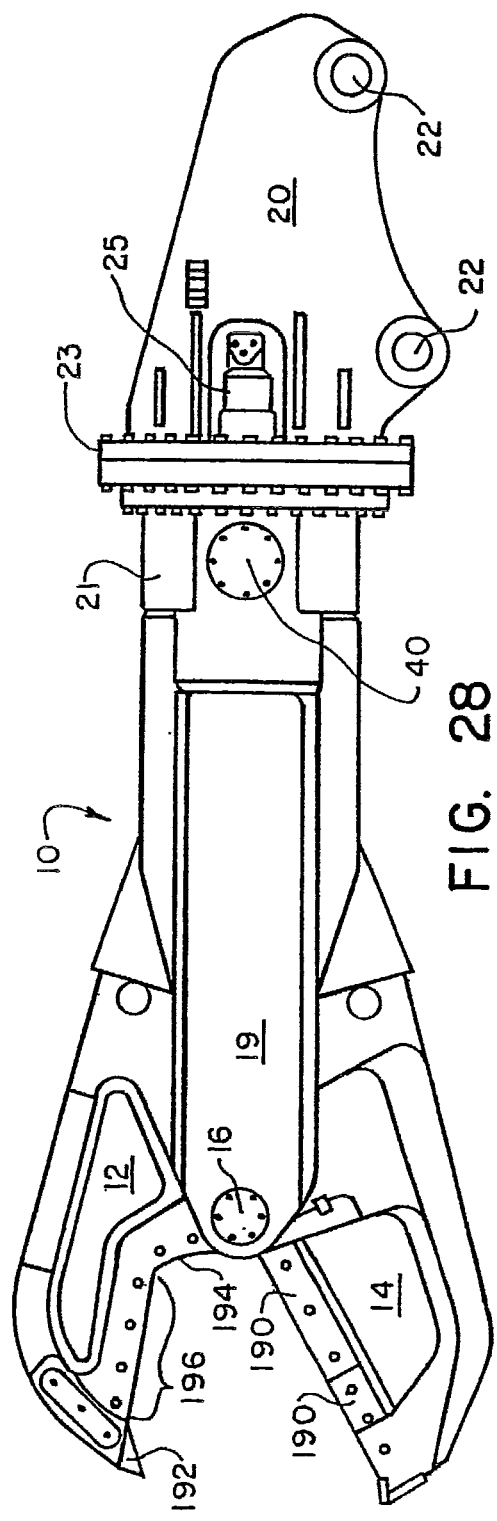
FIG. 28 is a side view similar to FIG. 1 illustrating a heavy-duty shear according to another embodiment of the present invention.
Figure 30:
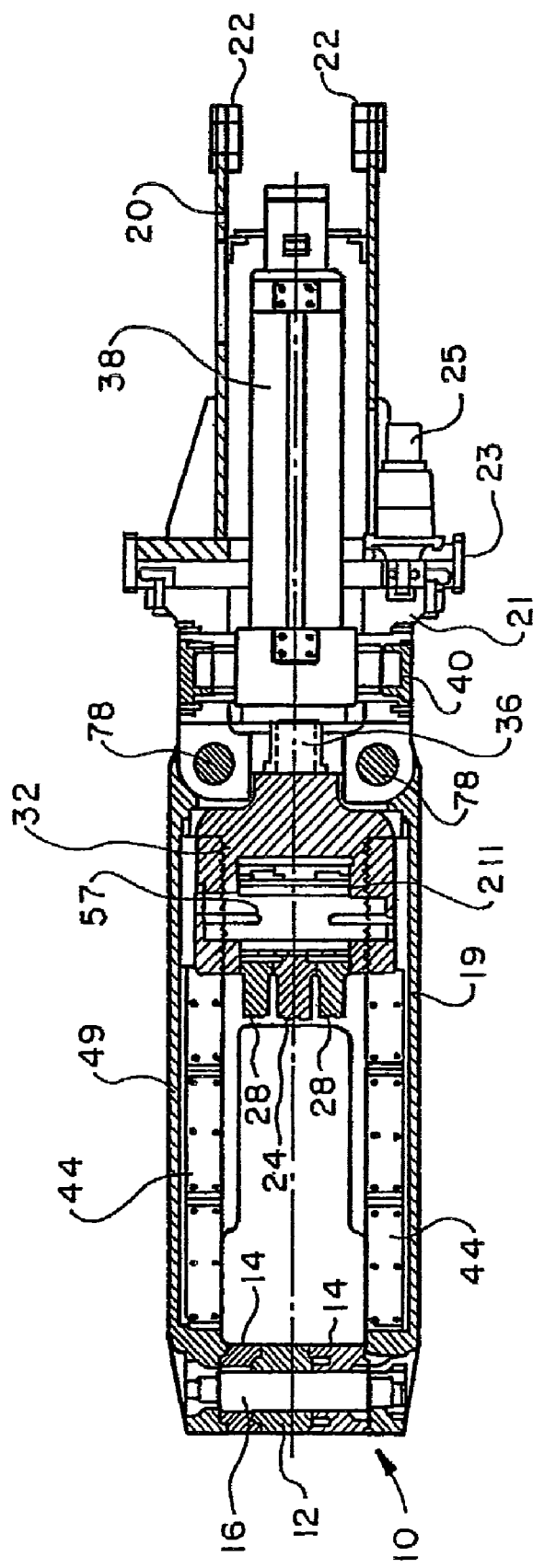
FIG. 30 is a sectional view of the shear illustrated in FIG. 28.

FIGS. 28-30 illustrate a shear 10 similar to shear 10 of FIG. 1, except that the quick change feature is modified to utilize the pivoting sides 19 of the universal body 18. Specifically, the bridge housing 48 has been omitted and the main pin 16 is used to couple the jaw set directly to the universal body 18. FIG. 29 illustrates bolts 198 which can be used for holding the sides 19 of the universal body 18 together.

FIGS. 31-34 schematically illustrate the process of disassembling the jaw structure and inserting a new jaw structure at the main pin 16 for the quick change device shown in FIGS. 28-30. As best shown in these figures, this design essentially keeps the structure generally symmetrical about the center line thereby avoiding inappropriate torquing during use of the shear 10. It will be appreciated that bearing sleeves 202 may be positioned between appropriate elements and the main pin 16. Retaining members 204 may be secured for holding the assembly in place.

As illustrated in FIG. 32, by removing retaining bolts 206, a retaining cap 208, retaining clips 210 and an alignment sleeve 212 from attachment with the sides 19 of the universal body 18, the main pin 16 and associated assembly is ready for removal. As shown in FIG. 33, once the retaining system has been disassembled, the sides 19 of the universal body 18 rotate outwardly to simplify the removal process.

It will be apparent that before the first and second blades 12 and 14 can be removed, the linkages 24 and 28 must be detached from either the first and second blades 12 and 14 or the slide member 32. In general, the pivot pins 26 and 30 are removed for disconnecting the linkages 24 and 28 from the respective blades 12 and 14. However, it is possible for the linkages 24 and 28 to remain with the blades 12 and 14 as a single tool unit. This may be important if different linkage lengths are desired for the next tool set.

Figure 6:
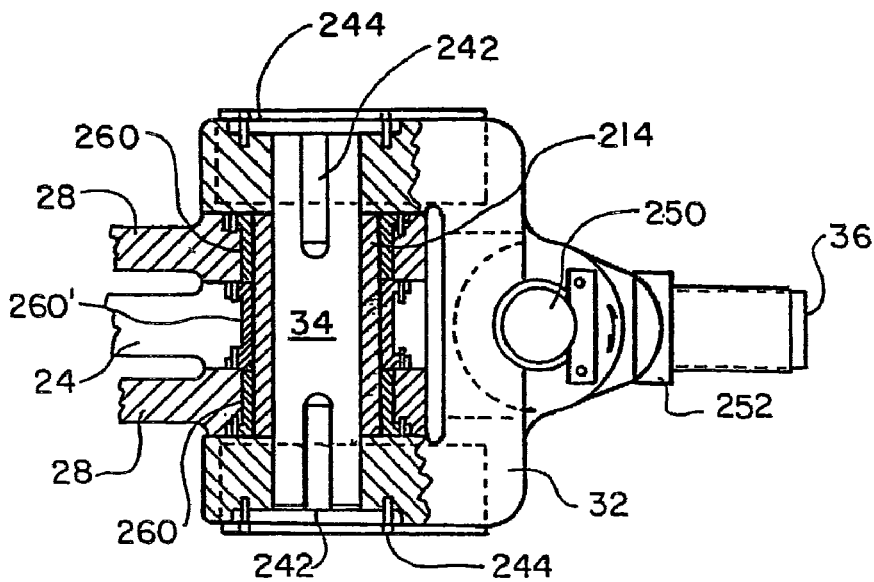
FIG. 6 is an enlarged plan view, partially in section, of a slide member of the universal body according to the present invention.

Maintaining the first linkage 24 and the second linkage 28 with the first and second blades 12 and 14 requires the decoupling of the linkages 24 and 28 from the slide member 32, or alternatively, decoupling the slide member 32 from the piston rod 36. In this latter arrangement, the decoupling of the slide member 32 from the piston rod 36 can be by bolts, a pin type connection or other secure fastening which can be easily disassembled. A continuous sleeve 214, shown in FIG. 6, is positioned around pivot pin 34 which couples the linkages 24 and 28 to the slide member 32. The sleeve 214 provides that the linkages 24 and 28 will be held together in a single assembly around sleeve 214 following the removal of pivot pin 34. This structure allows the linkages 24 and 28 to be removed, if needed. The removal of the linkages may be desired so that the linkage lengths can be changed with the next tool set.

Regardless of how the linkages are decoupled, with the linkages 24 and 28 decoupled and the sides 19 of the universal body 18 rotated outward, the entire jaw structure comprising the blades 12 and 14, and linkages 24 and 28, if maintained with the blades 12 and 14, can be removed and a separate tool assembly installed (with new linkages 24 and 28 if these were removed). Following this assembly, the sides of the universal body 18 will be pivoted back together and the retaining system attached around a new main pin 16 such as shown in FIG. 32. Bolts will reattach the sides 19 of the universal body 18 to complete the reassembly. As shown in FIG. 34, the new blades 12 and 14 have different retaining members and bearing sleeves associated with this particular tool unit. A particular bearing structure will be designed in accordance with the specific tool unit implemented.

Figure 35:
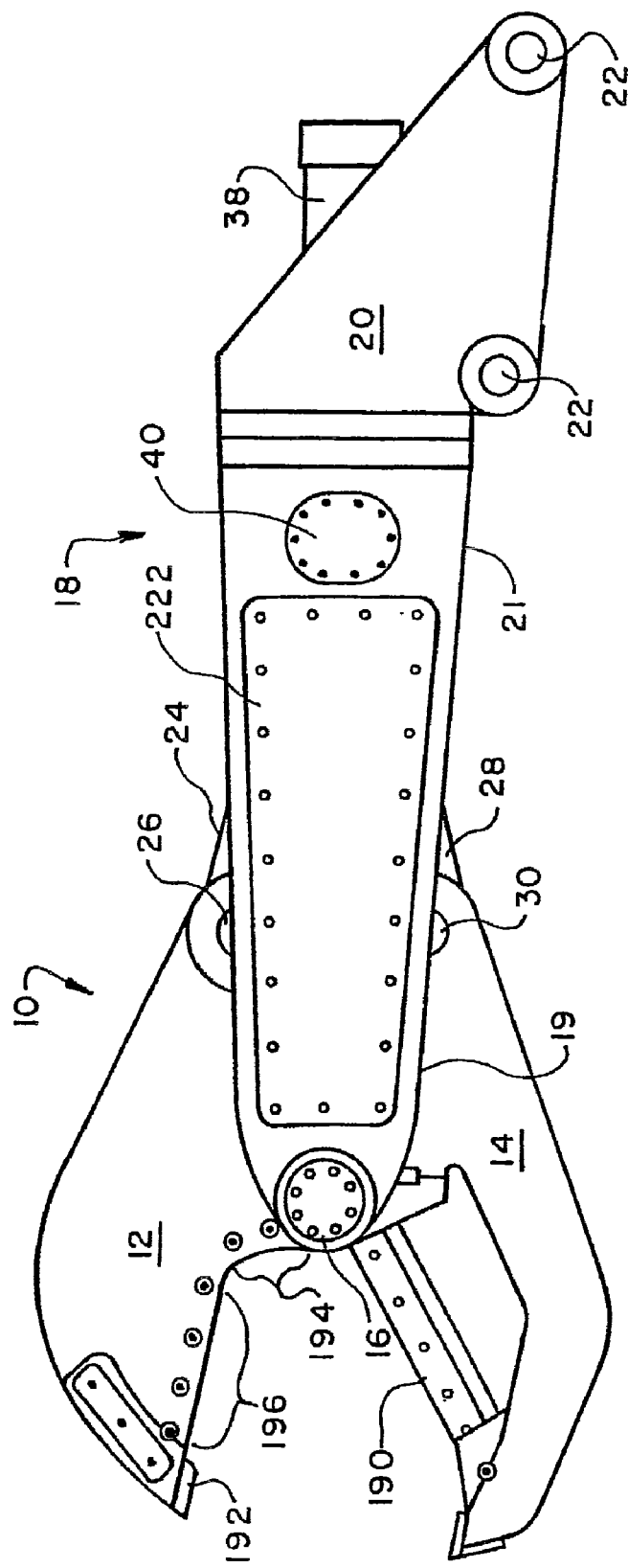
FIG. 35 is a side view of the shear according to FIG. 28 incorporated into a modified universal body.

FIG. 35 illustrates a shear 10 which incorporates a side access plate 222 for permitting access to the slide member 32 and the associated pivot pin 34. Specifically, the universal body 18 includes the access plates 222 secured thereto which can be removed to gain access to the guided slide member 32 within the universal body 18.

Figure 36:
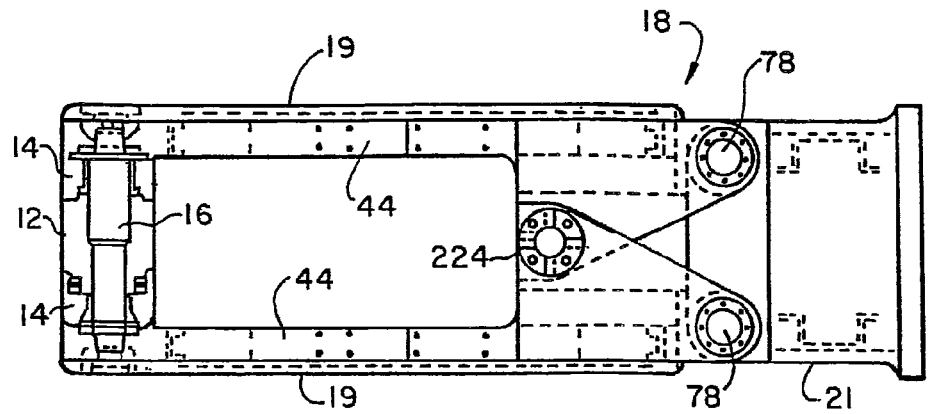
FIG. 36 is a plan view of a modified universal body according to the present invention.

FIG. 36 illustrates a modified universal body 18 in which the bolts for attaching the pivotable sides 19 of the universal body 18 are replaced with a retaining connection 224.

Figure 37:
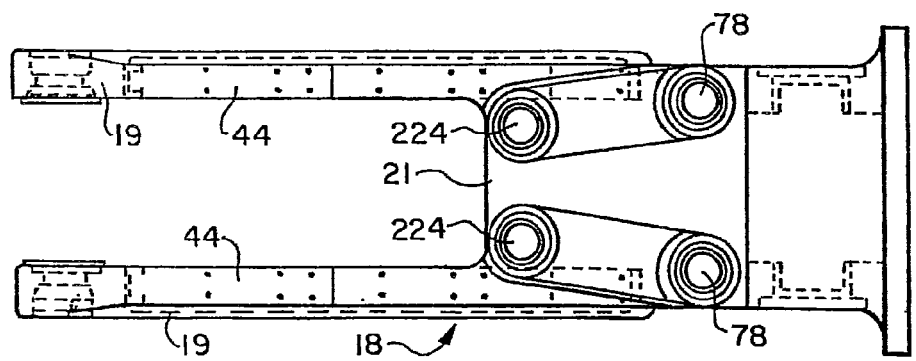
FIG. 37 is a plan view of another modified universal body according to the present invention.
Figure 38:
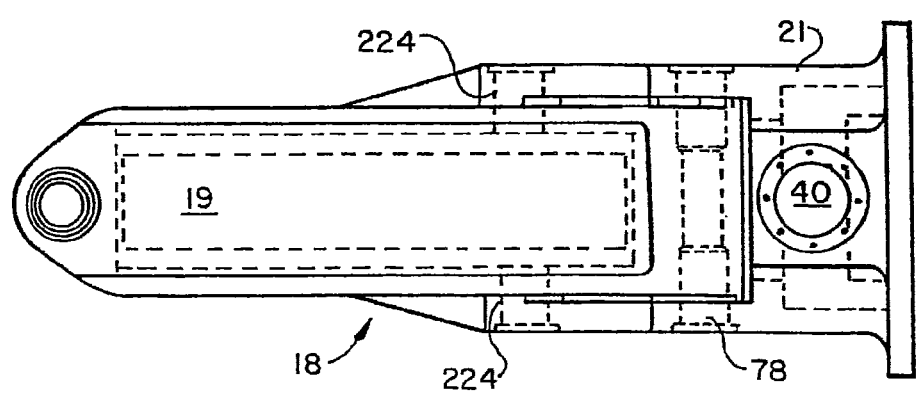
FIG. 38 is a side view of the universal body illustrated in FIG. 37.

FIGS. 37 and 38 illustrate a modified universal body 18 in which the sides 19 of the universal body 18 are pivoted about side pivots 78 and are secured by independent retaining connections 224 to the universal body 18.

Figure 39:
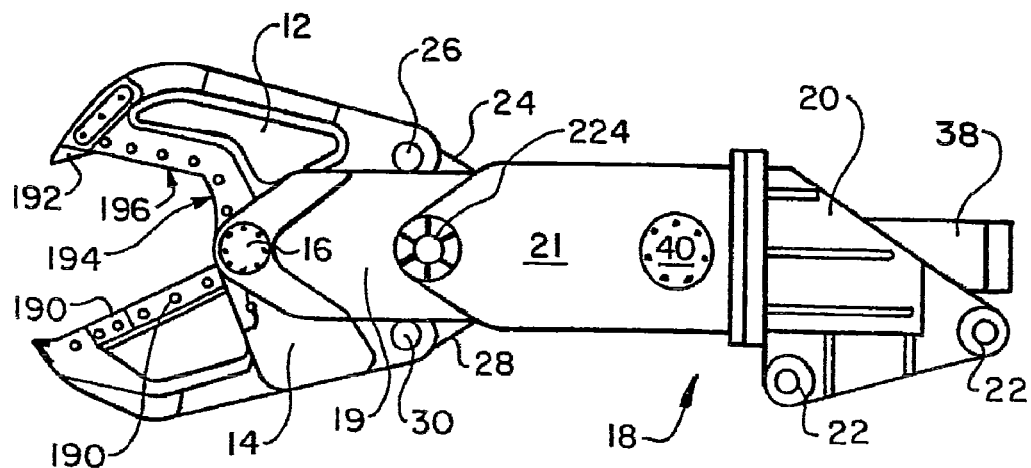
FIG. 39 is a side view of the shear according to FIG. 28 incorporated into a modified universal body.
Figure 40:
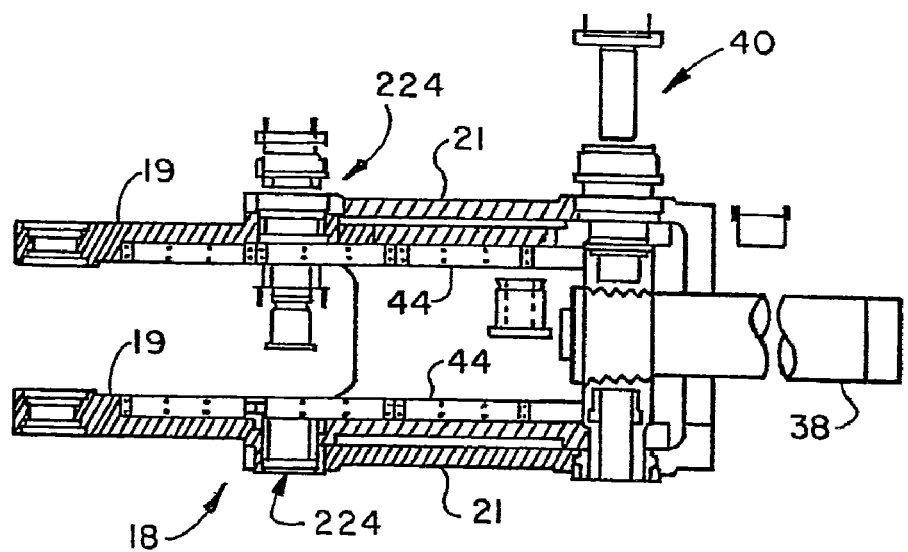
FIG. 40 is a plan view of the universal body illustrated in FIG. 39.

FIGS. 39 and 40 illustrate a further modified universal body 18 in which the sides 19 of the universal body 18 are completely separable from the remaining portions of the universal body 18 and secured thereto by the attachment of the trunnion 40 and separate retaining connections 224.

FIG. 41 illustrates a modification of the shear 10 in which the slot 44 is replaced with a guide rod 230 upon which the slide member 32 slides. This modification also results in changing the attachment of the linkages 24 and 28 from a common position to separate offset positions by independent pins 232 and 234. This change also results in a change in the geometric relationship discussed above in which the offset created must be accounted for in the resulting shear. This offset provides a less desirable shear in terms of cutting characteristics.

Figure 7:
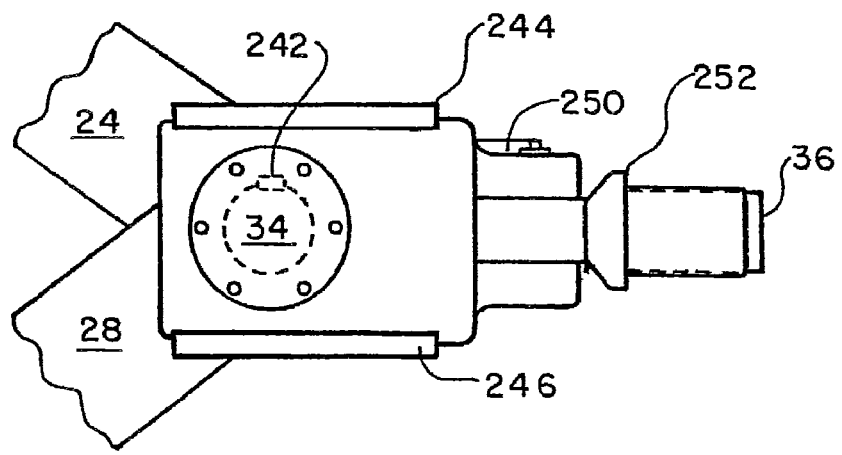
FIG. 7 is a side view of the slide member illustrated in FIG. 6.

Another aspect of the present invention is the details of the slide member 32 and the coupling to the piston rod 36 as shown in FIGS. 4, 6 and 7. A sleeve 214 is specifically formed as a hardened steel member and is keyed to the pivot pin 34 through a key 242 positioned behind a cover plate 244. Wear plates 246 are on the sides of the slide member 32 to be captured in the slot 44 against wear plates 248 in groove 44. The slide member 32 is connected through a pin 250 to a rod eye 252 of the piston rod 36. The pin 250 allows for rotation of the rod 36 about an axis which is 90 degrees from the axis of the trunnion 40. The sleeve 214 will maintain the linkages 24 and 28 together even following removal of the pin 34. Additionally, the replaceable sleeve 214 absorbs most of the transmitted shear load such that most of the wear will occur on the sleeve 214 and not the pin 34. Bushings 260 located at each linkage 24 and 28 will ensure proper alignment and eliminate linkage-to-linkage, or linkage-to-slide member, wear. Keying the pivot pin 34, sleeve 214 and slide member 32 together by key 242 will prevent rotation of the pin 34 or sleeve 214 and eliminate the likelihood of flat spots developing on either structure. The pinning of the rod eye 252 to the slide member 32 allows for misalignment in relation to the hydraulic cylinder 38 and the slide member 32 which, in conjunction with the trunnion 40, will help to prolong the seal life of the hydraulic cylinder 38. Finally, it is anticipated that the wear plates 246 will be made of high wear brass with impregnated graphite, thus eliminating the need for lubrication of these components. These components will serve two functions. First, they prevent the frictional wear between the slide member 32 and the mating part in the slot 44. Second, the wear plates 246 serve to keep exact linear motion of the slide member 32 in the event of unperceived side loading, thereby maintaining the highest possible cylinder force in operation.

FIG. 42 is a schematic illustration of a jaw and linkage design also including an offset similar to that shown in FIG. 41. However, the embodiment illustrated in FIG. 42 is considered a "negative" offset due to the crossing of the respective linkages 24 and 28. The negative offset represented by the embodiment illustrated in FIG. 42 may have a beneficial effect in the theoretical operation of the shear, however, appropriate design of the crossing or linkage arrangement increases the complexity of the device.

Figure 43:
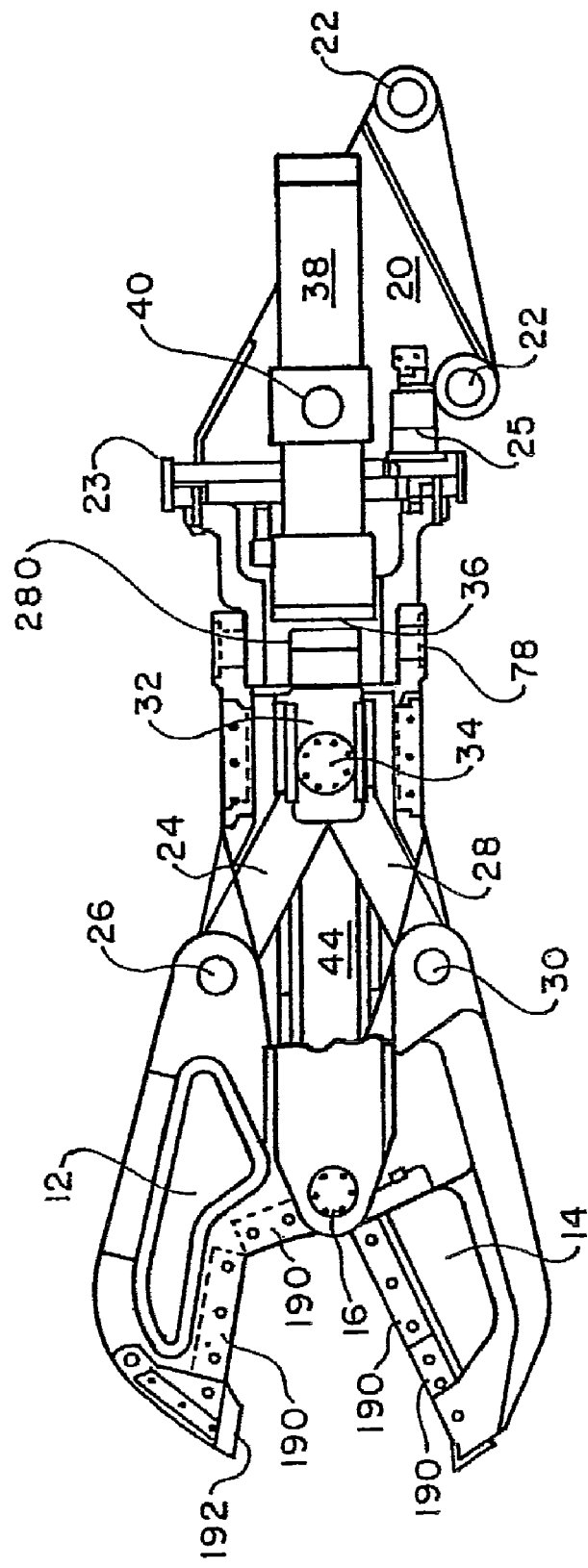
FIG. 43 is a side view, partially in section, of a shear according to the present invention incorporated into a further modified universal body.

FIG. 43 illustrates an embodiment of the shear 10 in which a rotatable connection 280 is provided between the piston rod 36 and the slide member 32. The provision of the rotational coupling 280 means that the trunnion 40 can be moved back and utilized for attaching the hydraulic cylinder 38 to the bearing housing 20 rather than attaching it to the yoke 21. Furthermore, since the hydraulic cylinder 38 will not rotate when the universal body 18 rotates, a simple, more conventional hydraulic cylinder 38 can be utilized in this embodiment.

Figure 44:
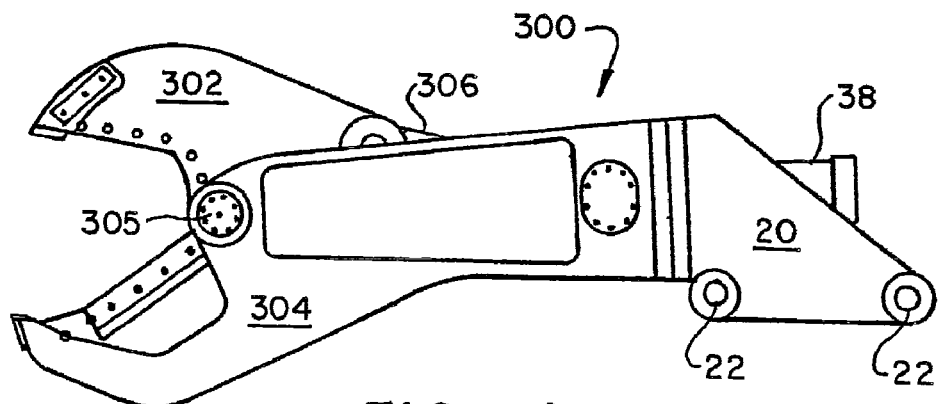
FIG. 44 is a side view of a shear according to the present invention.
Figure 45:
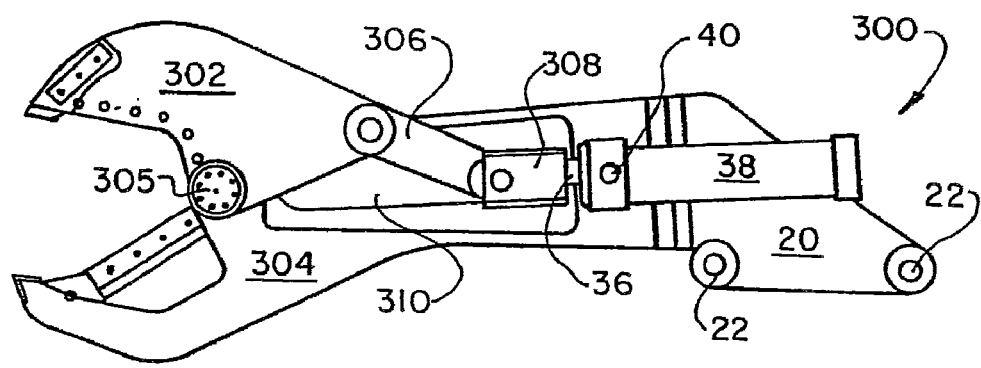
FIG. 45 is a side view, with a front side removed for clarity, of the shear illustrated in FIG. 44.
Figure 46:
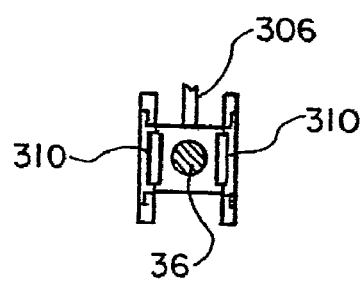
FIG. 46 is a sectional view taken along line A-A of FIG. 45.

FIGS. 44-46 illustrate a shear 300 of a distinct type different from the shear 10. Specifically, the shear 300 includes a first pivotable blade 302 pivotally attached to a fixed blade 304 through a hub 305. The shear 300 is similar to the shear 10 in that a linkage 306 couples the blade 302 to a slide member 308 which is received in a guiding slot 310. The shear 300 additionally includes piston rod 36, hydraulic cylinder 38, trunnion 40 and the bearing housing 20 similar to shear 10 described above.

Figure 47:
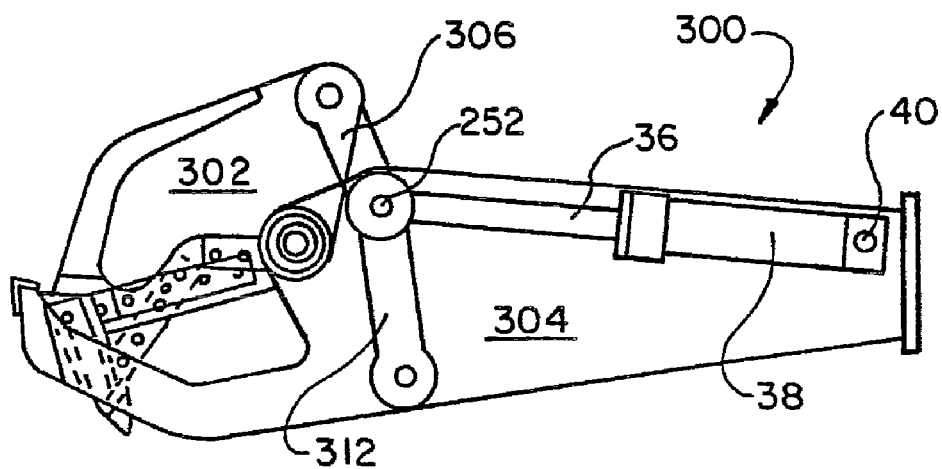
FIG. 47 is a schematic side view of a shear according to the present invention.
Figure 48:
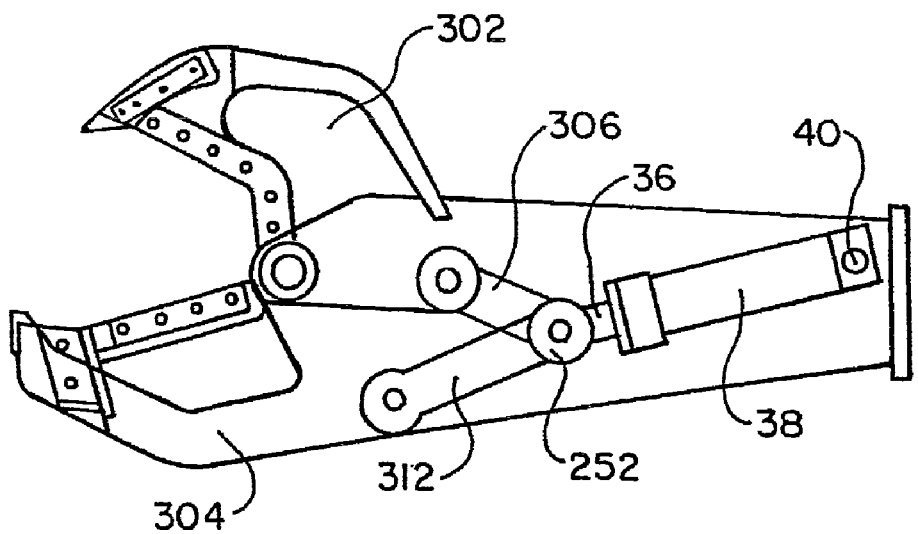
FIG. 48 is a schematic side view of the shear illustrated in FIG. 47 in the closed position.

FIGS. 47 and 48 illustrate a modification of shear 300 in which the slide member 308 and slot 310 are replaced with a separate linkage 312 to the fixed blade 304 and the rod eye 252 of piston rod 36. The linkage 306 is also attached to the rod eye 252 and linkage 312. In this embodiment, the guiding of the piston is non-linear and travels through an arc defined by the linkage 312. The hydraulic cylinder 38 will also pivot about trunnion 40 throughout the movement of the linkage 312.

FIGS. 49-53 illustrate a shear 10 which details a universal body 18 incorporating a simple four pin connection between the rotary coupling 23 and an adapter 20a. The adapter 20a essentially replaces the bearing housing 20 of earlier embodiments. As shown in FIGS. 50 and 51 the rotary coupling 23 includes parallel connecting plates 320 which receive four connector pin assemblies 330. The connector pin assemblies 330 provide a simple connection between the rotary coupling 23 and the adapter 20a. A connector pin assembly 330 is shown in detail in FIG. 51. Each connector pin assembly 330 includes a connecting pin 332 received in and extending between a pair of adjacent connector plates 320 within bushings 334 and 336. The bushing 336 and the connecting pin 332 receive a locking bolt 338 secured by a nut 340 to hold the connector pin assembly 330 in position. As shown in FIGS. 52 and 53, the adapter 20a includes a pair of parallel side plates having receiving apertures 342 that are received between pairs of adjacent connecting plates 320 to receive the connecting pin 332 therethrough. This provides a simple, easily released connection between the rotary coupling 23 and the adapter 20a.

FIG. 54 illustrates a shear 10' which details a universal body 18' incorporating a simple four pin connection between the yoke 21' and the adapter 20a. The four pin connection is similar to the shear of FIG. 49 except without a rotary coupling in the universal body. The parallel connecting plates extend from the yoke 21' rather than the rotary coupling.

Figure 49:
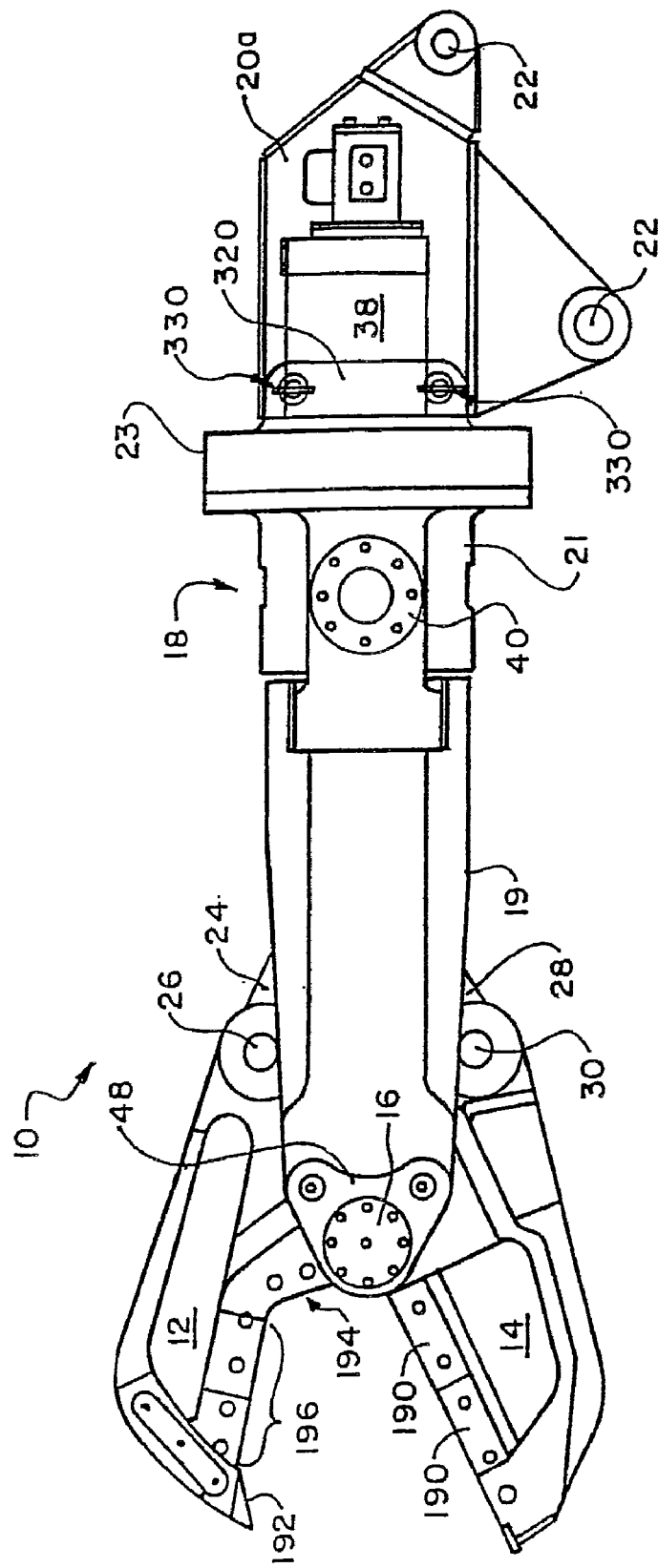
FIG. 49 is a side view, partially in section, of a shear according to the present invention incorporated into a further modified universal body.

FIG. 55 illustrates a shear 10 incorporating a simple four pin connection between the rotary coupling 23 and the adapter 20a as shown in FIG. 49. The shear 10 of FIG. 55 is designed as a stick mounted type shear, also referred to as a third member mount type adapter. Essentially, the adapter 20a is configured for this type of arrangement. FIG. 55 further illustrates the versatility of the shears of the present invention.

Figure 58:
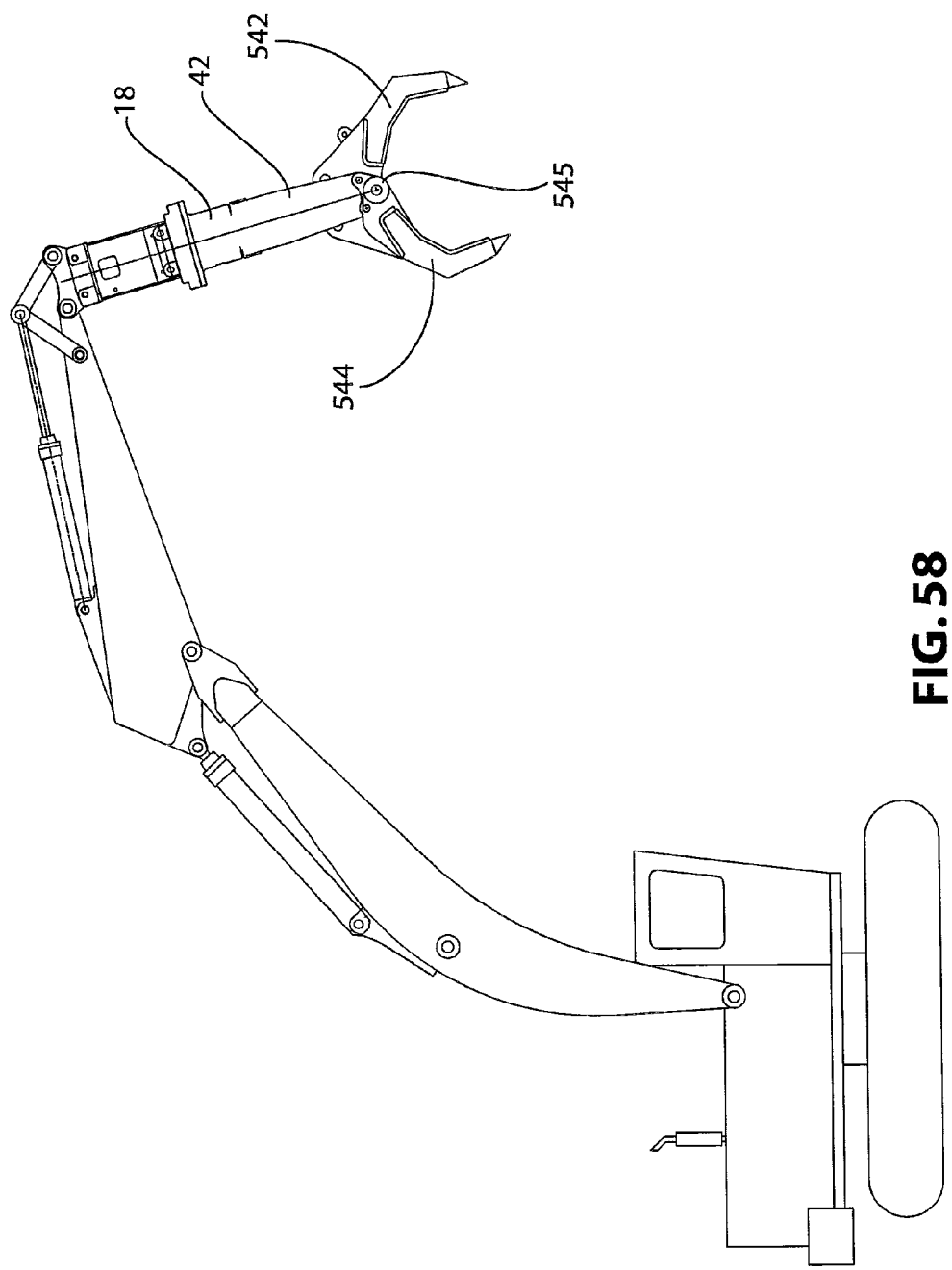
FIG. 58 is a side view of a grapple according to the present invention incorporated into the universal body of FIG. 1.

Directing attention to FIG. 58, a tool set 540, which is a grapple, is illustrated coupled to a receiving member 42 of a universal body 18 having two hydraulically actuated jaws 542, 544.

Figure 59:
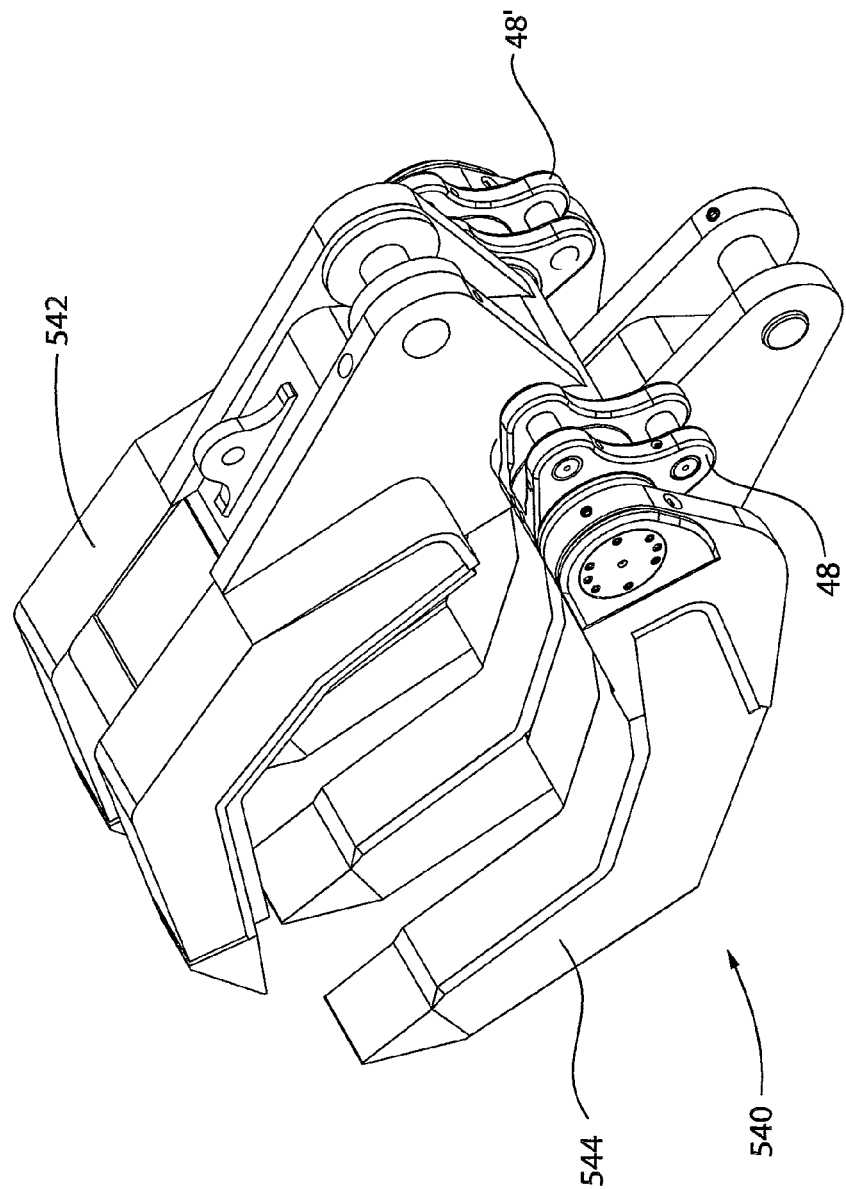
FIG. 59 is a perspective view of one embodiment of the tool set associated with the grapple.
Figure 60:
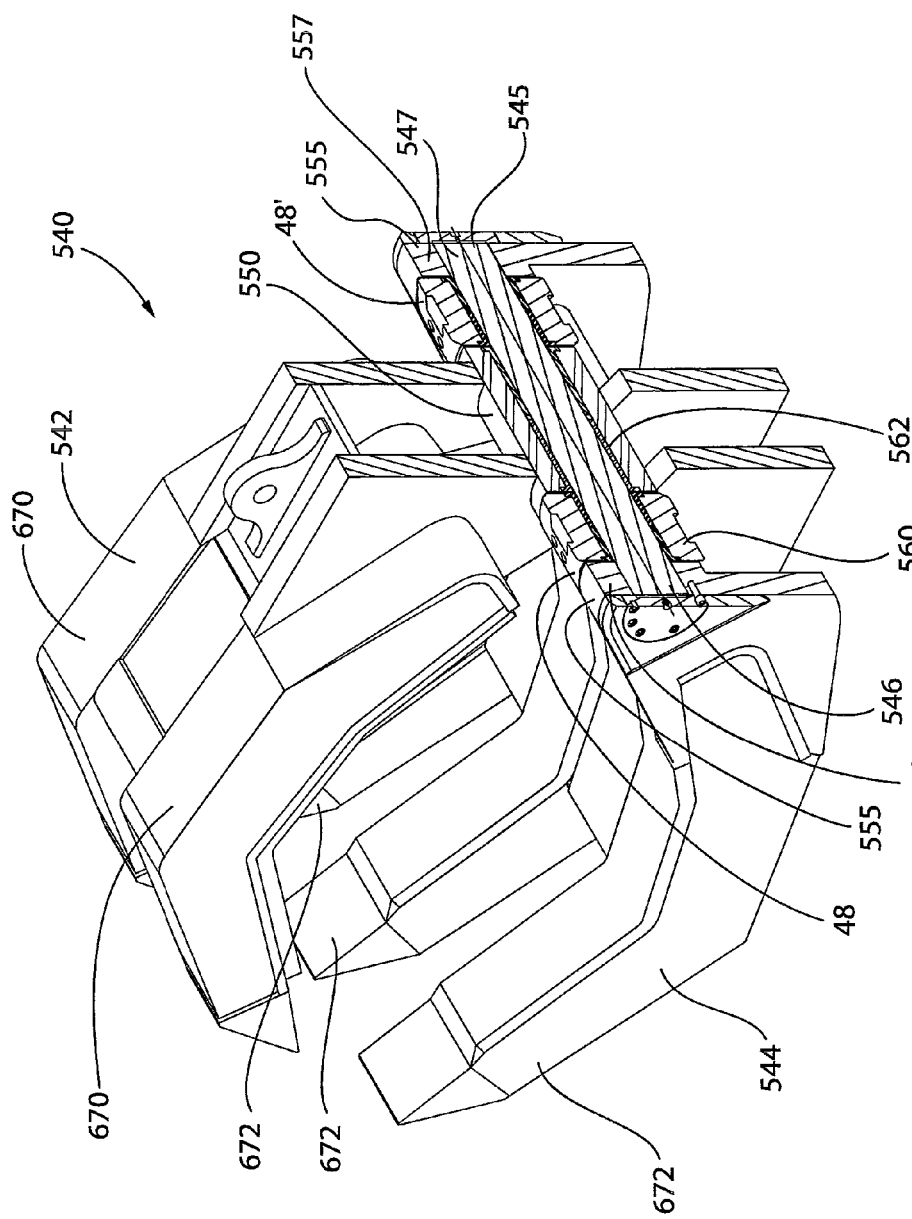
FIG. 60 is a cut-away view of a portion of the tool set illustrated in FIG. 59.

Directing attention to FIGS. 59 and 60, the grapple 540 includes a main pivot pin 545 with the first jaw 542 and the second jaw 544 connected to the main pivot pin 545.

Figure 62B:
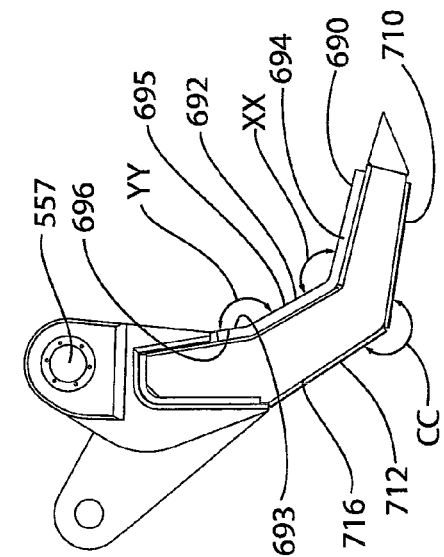
FIGS. 62A, 62B and 62C are a perspective, side and top view of the lower jaw illustrated in FIG. 59.
Figure 62C:
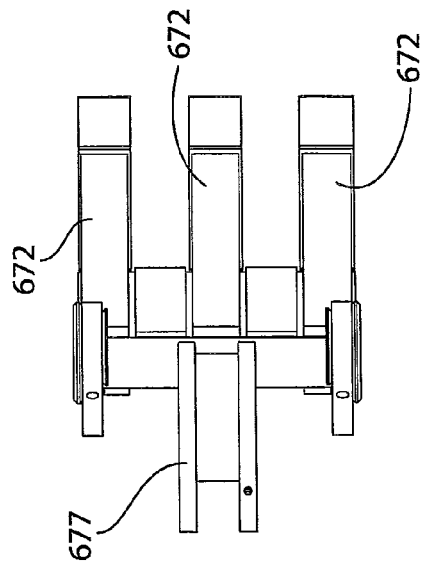
Figure 62A:
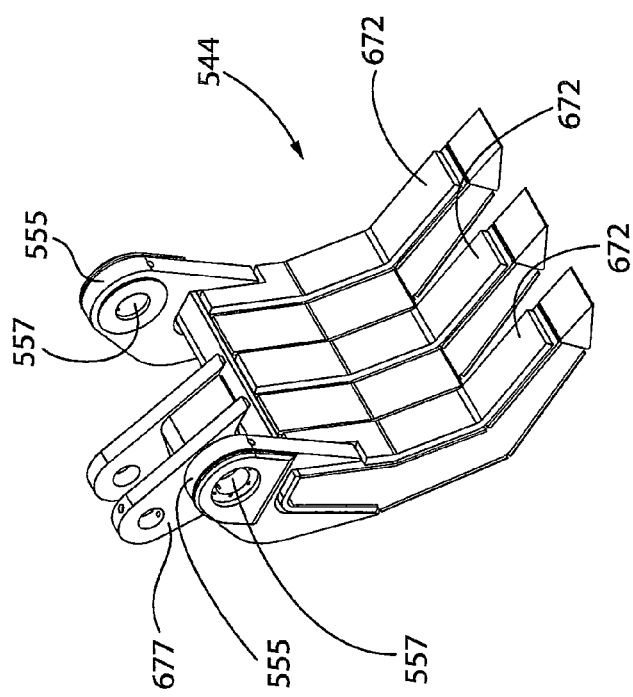

Directing attention to FIGS. 60, 61 and 62, the first jaw 542 has a first jaw base 550 and the second jaw 544 has a second jaw base 555 with a first part 556 and a second part 557, wherein each base 550, 555 has a bore 552, 557, respectively, extending therethrough and each base 550, 555 is connected through the bores 552, 557 to the main pivot pin 545 to provide relative rotational motion between the first jaw 542 and the second jaw 544.

Directing attention to FIGS. 59 and 60, two bridge housings 48, 48' are illustrated, however, for purposes of discussion, only the details of a single bridge housing 48 will be discussed with the understanding that bridge housing 48' is identical.

The bridge housing 48 has a bridge housing base 560 with a bore 562 extending therethrough and engaging the main pivot pin 545. The bridge housing 48 is adapted to be detachably connected to the receiving member 48 (FIG. 58) and a pair of removable jaws 542, 544 is adapted to be detachably connected to at least one hydraulic cylinder 38 (FIG. 43), such that the tool set 540 may be removed from or attached to the body 18 (FIG. 58) without the need to disengage or engage the main pivot pin 545 from the jaws 542, 544.

Figure 63:
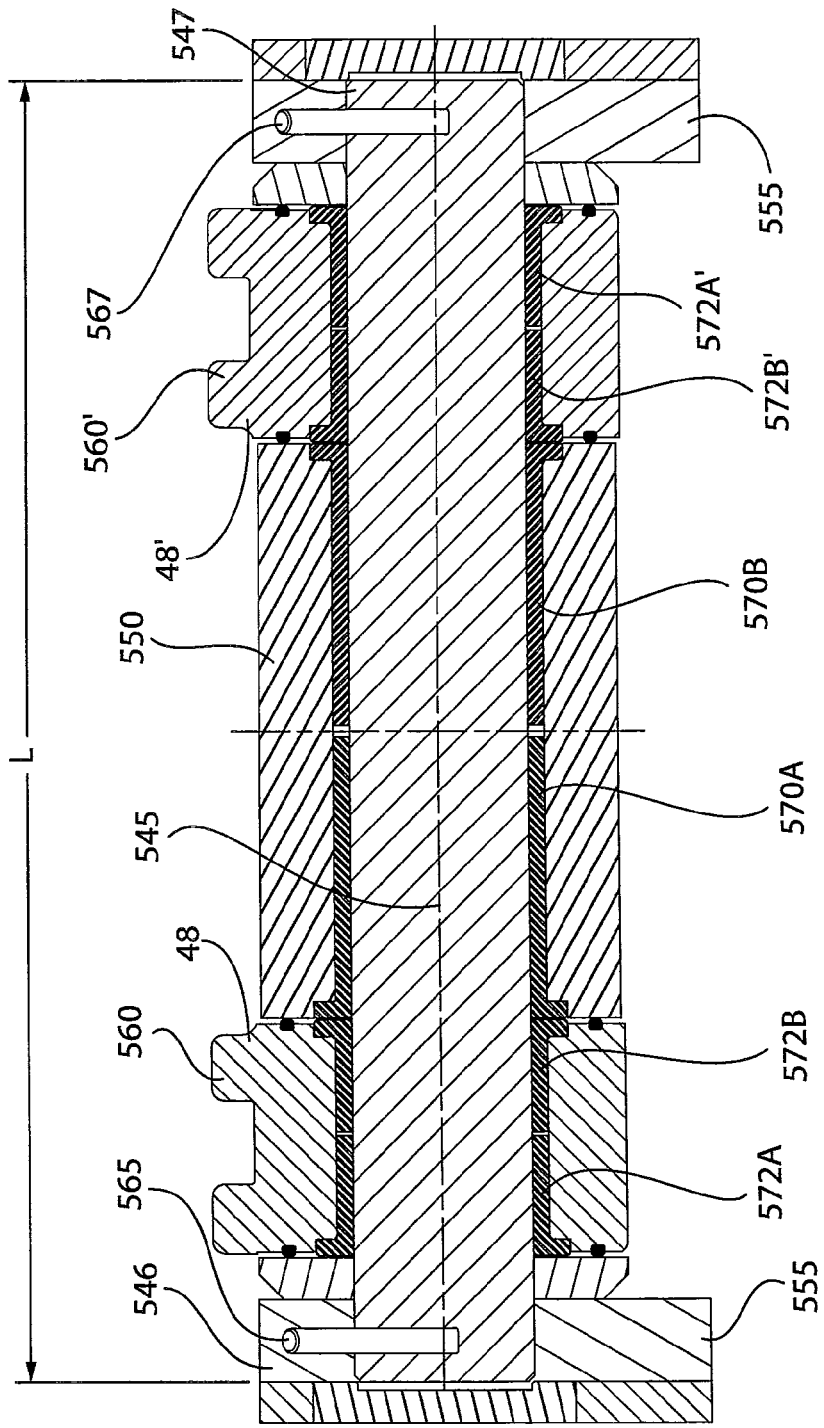
FIG. 63 is a side view enlargement of the section view illustrated in FIG. 60.

The main pivot pin 545 (FIG. 63) has a first end 546 and a second end 547 with a length L therebetween. The first jaw base 550 and the second jaw base 555 are separated along the length L of the main pivot pin 545 by the bridge housing base 560. As illustrated in FIGS. 60 and 63, the second jaw base 555 is connected to the main pivot pin 545 at the first end 546 and at the second end 547 of the main pivot pin 545.

Of particular interest and as illustrated in FIGS. 60 and 63, there are two bridge housings 48, 48' and each bridge housing 48, 48' is connected to the main pivot pin 545 adjacent to the first jaw base 550 connection in a direction inwardly from the ends 546, 547 of the main pivot pin 545. Additionally, the first jaw base 550 is connected to the main pivot pin 545 between the bridge housings 48, 48'. As illustrated in FIGS. 60 and 63, the first jaw base 550, the second jaw base 555 and the bridge housing 48, 48' bases 560, 560' are connected to the main pivot pin 545 in a symmetrical manner.

Directing attention to FIGS. 60 and 63, the main pivot pin 545 is non-rotatably secured to the first part 556 of the second jaw base 555 at the first end 546 and to the second part 557 of the second jaw base 555 at the second end 547 of the main pivot pin 545 with bolts 565, 567 extending radially through the main pivot pin 545 and through the second jaw base 555.

While the second jaw 554 is shown in the figures as non-rotatably secured to the main pivot pin 545, it should be appreciated that in the alternative one of either the first jaw 542 or the bridge housing 48 may be non-rotatably secured to the main pivot pin 545 instead. Therefore, at least two of the first jaw 550, the second jaw 555, and the bridge housing 48 are pivotally connected to the main pivot pin 545 to define pivotally connected members while the remaining item is non-rotatably secured to the main pivot pin 545. Preferably, one of either the first jaw 542 or the second jaw 544 is non-rotatably secured to the main pivot pin 545 and, as illustrated in the figures, the second jaw 544 is non-rotatably secured to the main pivot pin 545.

Directing attention to FIGS. 60 and 63, the tool set 540 further includes a split bushing 570A, 570B between and adjacent to the first jaw base 550 and the main pivot pin 545. Additionally, split bushings 572A, 572B are positioned between and adjacent to the bridge housing base 560 and the main pivot pin 545 and finally split bushings 572A', 572B' are positioned between and adjacent to the second bridge housing 48' and the main pivot pin 545.

Figure 64:
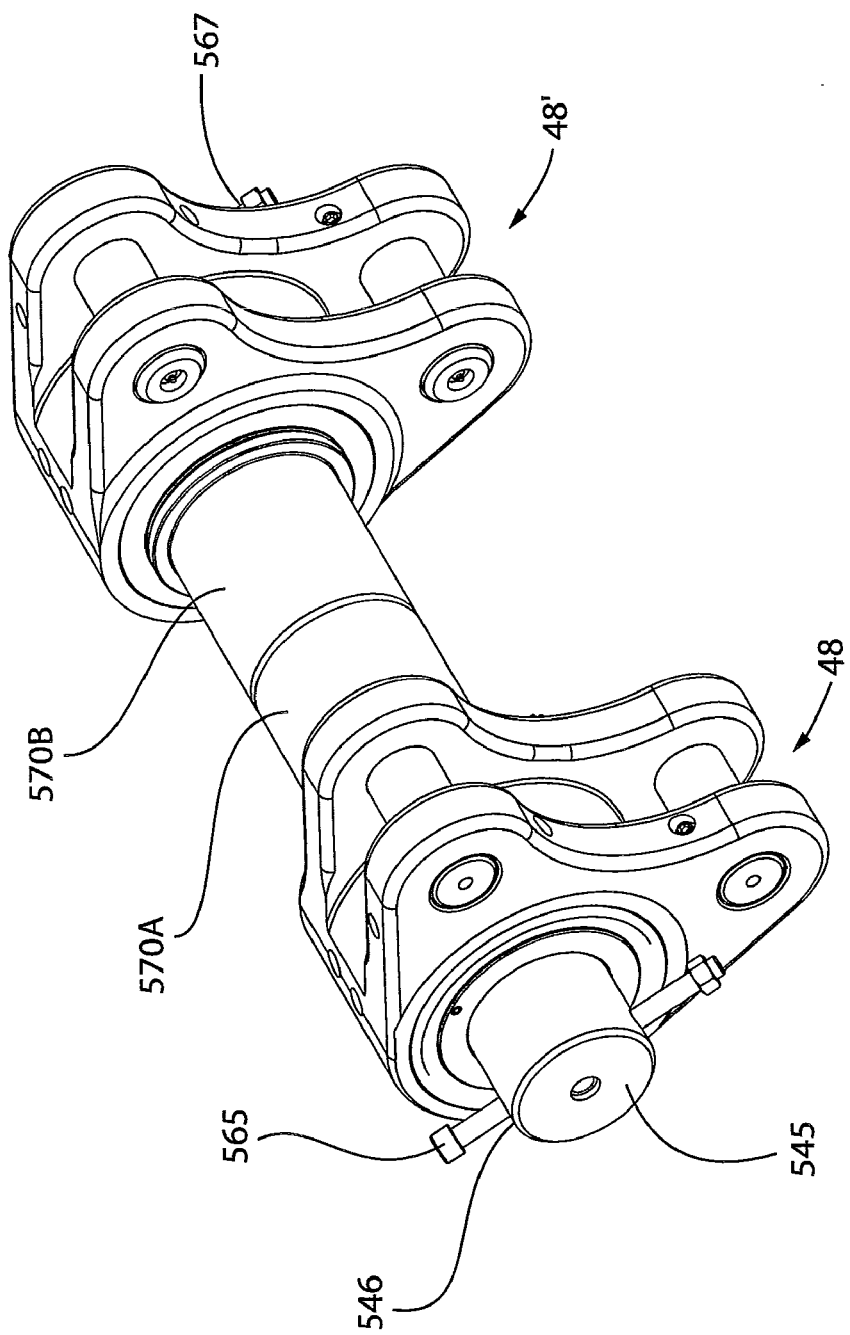
FIG. 64 is a perspective view of the main pivot pin and the associated bridge housings.

FIG. 64 illustrates a perspective view of the main pivot pin 545 with the bridge housings 48, 48' connected thereto along with the split bushing 570A, 570B extending over the main pivot pin 545 in the central region. It should be noted that the first end 546 and the second end 547 (FIG. 63) of the main pivot pin 545 extend beyond the bridge housing 48, 48' and it is upon these extending portions of the main pivot pin 545 to which the second jaw base 555 (FIG. 63) is non-rotatably secured with the bolt 565 at the first end 547 and with the bolt 567 (FIG. 63) at the second end 547.

Figure 65:
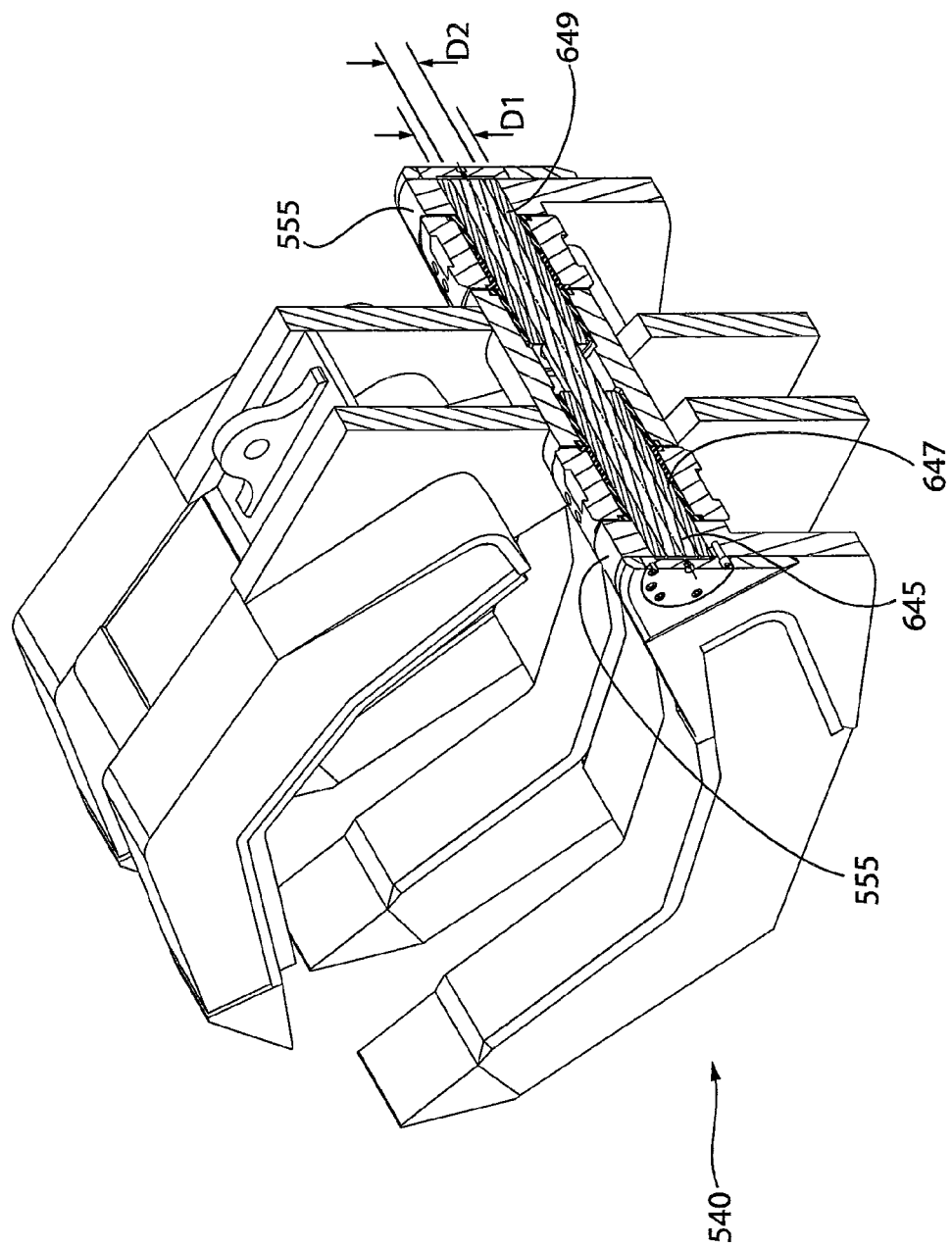
FIG. 65 is a second embodiment illustrating a cut-away perspective of the tool set utilizing sleeves to reinforce the main pivot pin.
Figures 66, 66A:
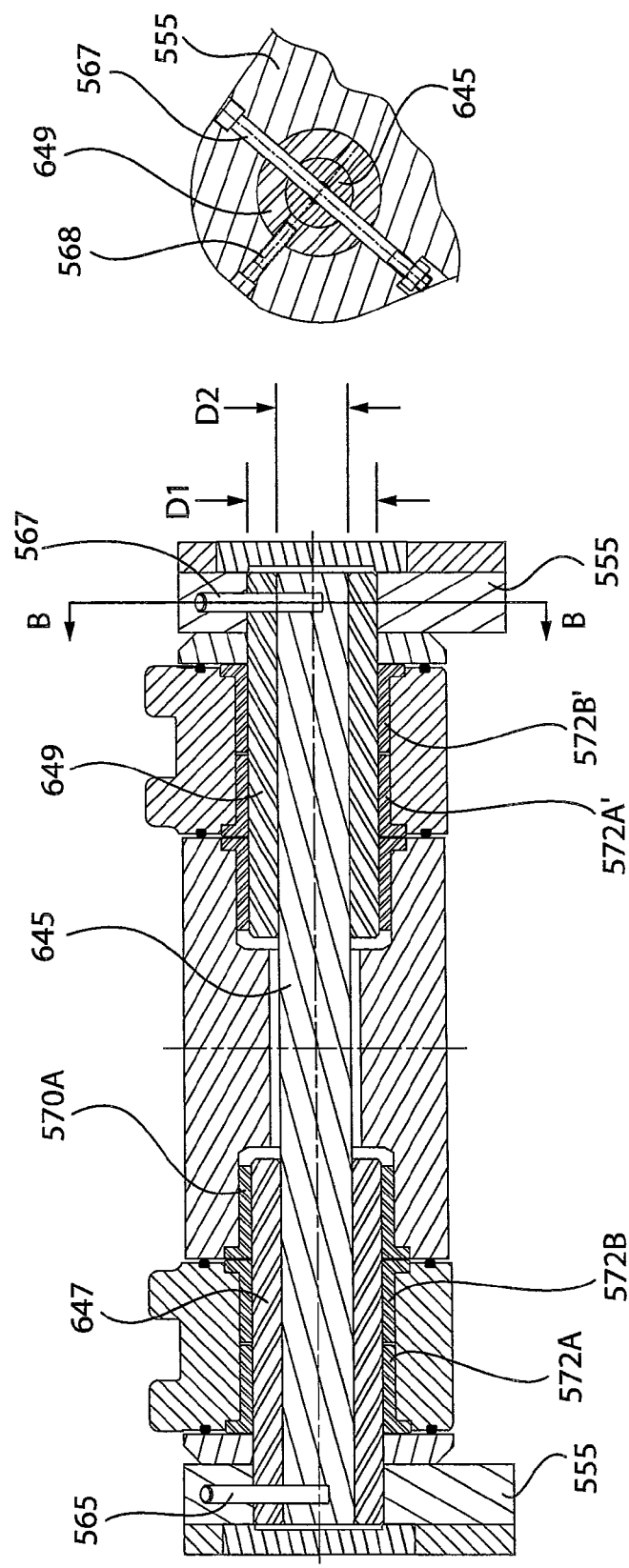
FIG. 66 is an enlargement of the section view illustrated in FIG. 65.
FIG. 66A is a cross-sectional view taken along line B-B in FIG. 66.
Figure 67:
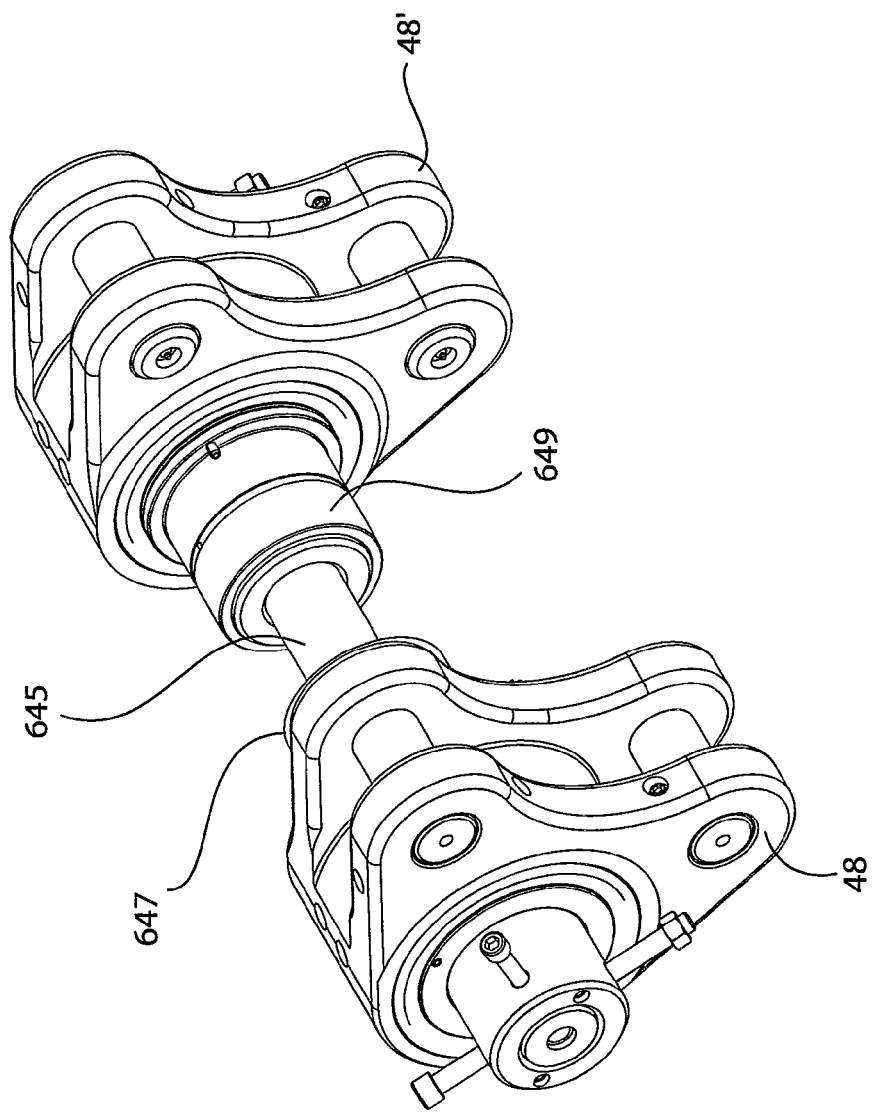
FIG. 67 is a perspective view of the main pivot pin with the associated sleeve and the associated bridge housings.

What has so far been discussed is a main pivot pin 545 having a diameter sufficient to withstand the high forces placed upon it during a demolition operation. FIGS. 65-67 provide an alternative embodiment, whereby the external components of the grapple 540 are identical, however, the main pivot pin 645 has a reduced diameter D2 but is strengthened through the introduction of sleeves 647, 649 around the main pivot pin 645 to provide structural support to the main pivot pin 545. The outer diameter of the sleeves 647, 649 is D1 and therefore, the first jaw 542, the second jaw 544, and the bridge housings 48, 48' do not require any modification from those earlier described. The same bushings used for the earlier embodiment may also be used for this embodiment with the exception that the split bushing 570A, 570B may be separated by a larger amount than the bushings illustrated with the earlier embodiment in FIG. 63. However, the bushings 572A, 572B associated with bridge housing 48 and the bushings 572A', 572B' associated with the second bridge housing 48' are the same as those previously discussed. Sleeve bolt 568 extends from the second jaw base 555 into the sleeve 649 to hold the sleeve 649 non-rotatable within the second jaw base 555. By utilizing this design, it is possible to remove the main pivot pin 545 from the assembly and the remaining components will remain intact since the sleeves 647, 649 remain intact.

Directing attention to FIGS. 60, 61, and 62, the first jaw 542 has a plurality of tines 670 which interweave with a plurality of tines 672 on the second jaw 544. Additionally, the first jaw 542 has a lug 575 attached thereto while the second jaw 544 has a lug 677 attached thereto. Each of these lugs is connected either directly or through a linkage to the hydraulic cylinder and the dimension and location of these lugs 675, 677 may be different on different tool sets to optimize the mechanical performance of the tool set.

Again directing attention to FIGS. 61 and 62, the first jaw 542 has tines 670 that are generally C-shaped and made up of at least two inwardly facing planar segments 680, 682, 683 angled with respect to one another. In particular, the surfaces 680, 682 are angled with respect to one another by an angle X of approximately 130 degrees, while the surfaces 682, 683 are angled with respect to one another by an angle Y of approximately 160 degree. Wear plates 684, 685, 686 are welded to these surfaces to minimize wear.

The second jaw 544 has tines 672 where again each tine 672 has a generally C-shaped section made up of inwardly facing planar segments, wherein the inwardly facing segments 690 form an angle XX with the inwardly facing segments 692 of approximately 130 degrees, while the inwardly facing segments 692 form an angle YY with the inwardly facing segments 693 of approximately 160 degrees. Additionally, wear plates 694, 695, 696 are welded to the inwardly facing planar segments 690, 692, 693 to minimize wear of the tine surfaces, and tips 697 are welded to the end of each tine 672.

Additionally, the first tine 670 includes two outwardly facing planar segments 700, 702 and welded to each of these outwardly facing planar segments 700, 702 are wear plates 704, 705 to once again minimize wear of the tine surfaces. Tips 720 are welded to the end of each tine 670. Additionally, the second tine 672 includes two outwardly facing segments 710, 712 having wear plates 714, 716 welded thereto. With respect to the first tine 670, once again, the outwardly facing planar segments 700 forms with the outwardly facing planar segment 702 an angle C of approximately 120 degrees. Additionally, the outwardly facing planar segments 710, 712 of the second tine 672 form an angle CC of approximately 130 degrees with respect to one another.

It will be apparent to those of ordinary skill in the art that various modifications may be made to the present invention without departing from the spirit and scope thereof. The described embodiments are intended merely to be illustrative of the concepts of the present invention and not restrictive thereof.

The invention claimed is:

1. A tool set for coupling to the receiving member of a body having at least one hydraulically powered jaw, the tool set comprising:
   a) a main pivot pin;
   b) a first jaw with a first jaw base and a second jaw with a second jaw base wherein the second jaw base has a first part and a second part, wherein each base has a bore extending therethrough and each base is connected through the bores to the main pivot pin to provide relative rotational motion between the first and second jaws;
   c) two bridge housings, each having a bridge housing base with a bore extending therethrough and engaging the main pivot pin, wherein each bridge housing has apertures extending therethrough and is adapted to be detachably connected to matching apertures of the receiving member and wherein the pair of movable jaws is adapted to be detachably connected to at least one hydraulic cylinder such that the tool set may be removed from or attached to the body without the need to disengage or engage the main pivot pin from the jaws;
   d) wherein the main pivot pin has a first end and a second end with a length therebetween and wherein the first jaw base and the two parts of the second jaw base are separated along the length of the main pivot pin by the bridge housing bases;
   e) wherein the first jaw base is connected to the main pivot pin between the bridge housings; and
   f) wherein the first part of the second jaw base is connected to the main pivot pin at the main pivot pin first end and the second part of the second jaw base is connected to the main pivot pin at the main pivot pin second end.

2. The tool set according to claim 1, wherein the first jaw base, second jaw base and the bridge housing base are connected to the main pivot pin in a symmetrical manner.

3. The tool set according to claim 1, wherein the bridge housing has a support surface adapted to mate with a complementary engaging surface of the receiving member when securing the bridge housing to the receiving member.

4. The tool set according to claim 3, wherein the support surface and the engaging surfaces are arcuate.

5. The tool set according to claim 3, wherein the bridge housing has apertures adapted to be mated with matching apertures of the receiving member through removable keeper pins to secure the bridge housing to the receiving member.

6. The tool set according to claim 5, wherein the apertures of the bridge housing are spaced apart and from one another and from the main pivot pin.

7. The tool set according to claim 1, wherein at least two of the first jaw base, the second jaw base and the bridge housing base are pivotally connected to the main pivot pin to define pivotally connected members.

8. The tool set according to claim 7, further including bushings between and adjacent to the pivotally connected members and the main pivot pin.

9. The tool set according to claim 7, further including at least one sleeve around the main pivot pin to provide structural support to the pivot pin and further including bushings between and adjacent to the pivotally connected members and the at least one sleeve over the main pivot pin.

10. The tool set according to claim 7, wherein at least one of the first jaw base, the second jaw base and the bridge housing base is non-rotatably secured to the main pivot pin.

11. The tool set according to claim 10, wherein one of the first jaw base and the second jaw base is non-rotatably secured to the main pivot pin.

12. The tool set according to claim 11, wherein the second jaw base is non-rotatably secured to the main pivot pin.

13. The tool set according to claim 11, wherein the jaw base is non-rotatably secured to the main pivot pin with a bolt extending radially through the main pivot pin and through the jaw base.

14. The tool set according to claim 10, wherein bushing associated with the first jaw base is a split bushing.

15. The tool set according to claim 1, wherein the tool set is a grapple.

16. The tool set according to claim 15, wherein the first jaw has a plurality of tines which interweave with a plurality of tines on the second jaw.

17. The tool set according to claim 15, wherein each jaw has a lug attached thereto connected to the hydraulic cylinder and the dimensions and location of the lug may be different on different tool sets to optimize the mechanical performance of the tool set.

18. The tool set according to claim 1, wherein the tool set is a grapple and, for the grapple,
   a) each jaw has a plurality of tines extending therefrom;
   b) the tines of the first jaw interweave with the tines of the second jaw;
   c) each tine has a generally c-shaped section made up of two inwardly facing planar segments angled with respect to one another; and
   d) wear plates are welded to the inwardly facing planar segments to minimize wear of the tine surfaces.

19. The grapple according to claim 18, wherein tips at the end of each tine are welded to the tine.

20. The grapple according to claim 18, further including two outwardly facing planar segments angled with respect to one another, wherein wear plates are welded to the outwardly facing planar segments.

* * * * *